United States Patent
Kirchhoff et al.

(10) Patent No.: US 7,369,537 B1
(45) Date of Patent: May 6, 2008

(54) ADAPTIVE VOICE-OVER-INTERNET-PROTOCOL (VOIP) TESTING AND SELECTING TRANSPORT INCLUDING 3-WAY PROXY, CLIENT-TO-CLIENT, UDP, TCP, SSL, AND RECIPIENT-CONNECT METHODS

(75) Inventors: Debra C. Kirchhoff, Santa Barbara, CA (US); Steven C. Boyle, Santa Barbara, CA (US)

(73) Assignee: Global IP Solutions, Inc., San Francisco, CA (US)

( * ) Notice: Subject to any disclaimer, the term of this patent is extended or adjusted under 35 U.S.C. 154(b) by 844 days.

(21) Appl. No.: 10/249,384

(22) Filed: Apr. 3, 2003

Related U.S. Application Data

(63) Continuation-in-part of application No. 09/682,084, filed on Jul. 18, 2001, now Pat. No. 6,978,383, and a continuation-in-part of application No. 10/248,762, filed on Feb. 14, 2003, now Pat. No. 7,206,932.

(51) Int. Cl.
*H04L 12/66* (2006.01)
*H04J 1/02* (2006.01)
*H04L 12/56* (2006.01)

(52) U.S. Cl. .................. 370/352; 370/395.5; 370/401; 370/493

(58) Field of Classification Search .............. 370/352, 370/353, 354, 355, 356, 235, 395.3, 395.31, 370/395.52, 401, 466, 467, 469, 493, 494, 370/495
See application file for complete search history.

(56) References Cited

U.S. PATENT DOCUMENTS

| | | | |
|---|---|---|---|
| 5,623,601 A | 4/1997 | Vu | 713/201 |
| 5,805,803 A | 9/1998 | Birrell et al. | 713/201 |
| 5,918,019 A | 6/1999 | Valencia | 709/227 |
| 5,999,979 A | 12/1999 | Vellanki et al. | 709/232 |
| 6,061,797 A | 5/2000 | Jade et al. | 713/201 |
| 6,104,716 A | 8/2000 | Crichton et al. | 370/401 |
| 6,111,893 A | 8/2000 | Volftsun et al. | 370/466 |
| 6,158,011 A | 12/2000 | Chen et al. | 713/201 |
| 6,202,081 B1 | 3/2001 | Naudus | 709/200 |
| 6,205,120 B1 | 3/2001 | Packer et al. | 370/235 |
| 6,215,784 B1 | 4/2001 | Petras et al. | 370/356 |
| 6,252,952 B1 | 6/2001 | Kung et al. | 379/114.1 |
| 6,266,418 B1 | 7/2001 | Carter et al. | 380/257 |
| 6,304,546 B1 | 10/2001 | Natarajan et al. | 370/216 |
| 6,311,215 B1 | 10/2001 | Bakshi et al. | 709/221 |

(Continued)

*Primary Examiner*—Brian Nguyen
*Assistant Examiner*—Farah Faroul
(74) *Attorney, Agent, or Firm*—Mark Rodgers

(57) ABSTRACT

A Voice-over-Internet-Protocol (VoIP) system includes clients that make management connections to an external manager server using web-browsing protocols. A discovery process tests a variety of transport methods by sending packets using different protocols to several ports of the external manager. Some packets may be blocked by firewalls, while other packets are allowed to pass through. Successful packet replies indicate transport capabilities of the client. When a client makes a VoIP call to another client, the external manager compares transport capabilities of the two clients and selects a transport capability that is common to both clients. Transport methods include direct client-to-client connections using TCP or UDP to an arbitrary port or well-known port 80 or 443, and indirect using a voice-proxy server that each client connects to using web standards such as HTTP or SSL. When a client can make only outgoing connections, that client initiates the connection.

4 Claims, 17 Drawing Sheets

U.S. PATENT DOCUMENTS

| | | |
|---|---|---|
| 6,337,858 B1 | 1/2002 | Petty et al. .................. 370/356 |
| 6,356,545 B1 | 3/2002 | Vargo et al. ................. 370/355 |
| 6,363,424 B1 | 3/2002 | Douglas et al. ............. 709/224 |
| 6,404,764 B1 | 6/2002 | Jones et al. ................. 370/352 |
| 6,434,149 B1 | 8/2002 | Jackson et al. ........... 370/395.4 |
| 6,452,922 B1 | 9/2002 | Ho .............................. 370/352 |
| 6,466,570 B1 | 10/2002 | Low et al. ................... 370/352 |
| 6,473,423 B1 | 10/2002 | Tebeka et al. .............. 370/352 |
| 6,484,257 B1 | 11/2002 | Ellis ........................... 713/153 |
| 6,487,278 B1 | 11/2002 | Skladman et al. ....... 379/88.13 |
| 6,490,550 B1 | 12/2002 | Hiri ............................ 704/201 |
| 6,496,867 B1 | 12/2002 | Beser et al. ................. 709/245 |
| 6,498,791 B2 | 12/2002 | Pickett et al. ............... 370/353 |
| 6,507,577 B1 | 1/2003 | Mauger et al. ............. 370/356 |
| 6,822,957 B1 * | 11/2004 | Schuster et al. ............ 370/389 |
| 6,823,479 B1 * | 11/2004 | McElhaney, Jr. et al. ..... 714/43 |
| 2002/0002622 A1 | 1/2002 | Vange ......................... 709/245 |
| 2002/0129236 A1 | 9/2002 | Nuutinen .................... 713/151 |
| 2002/0147818 A1 | 10/2002 | Wengrovitz ................. 709/228 |
| 2002/0184373 A1 | 12/2002 | Maes ........................... 709/228 |
| 2002/0186683 A1 | 12/2002 | Buck et al. .................. 370/352 |
| 2003/0009699 A1 | 1/2003 | Gupta et al. ................. 713/201 |

* cited by examiner

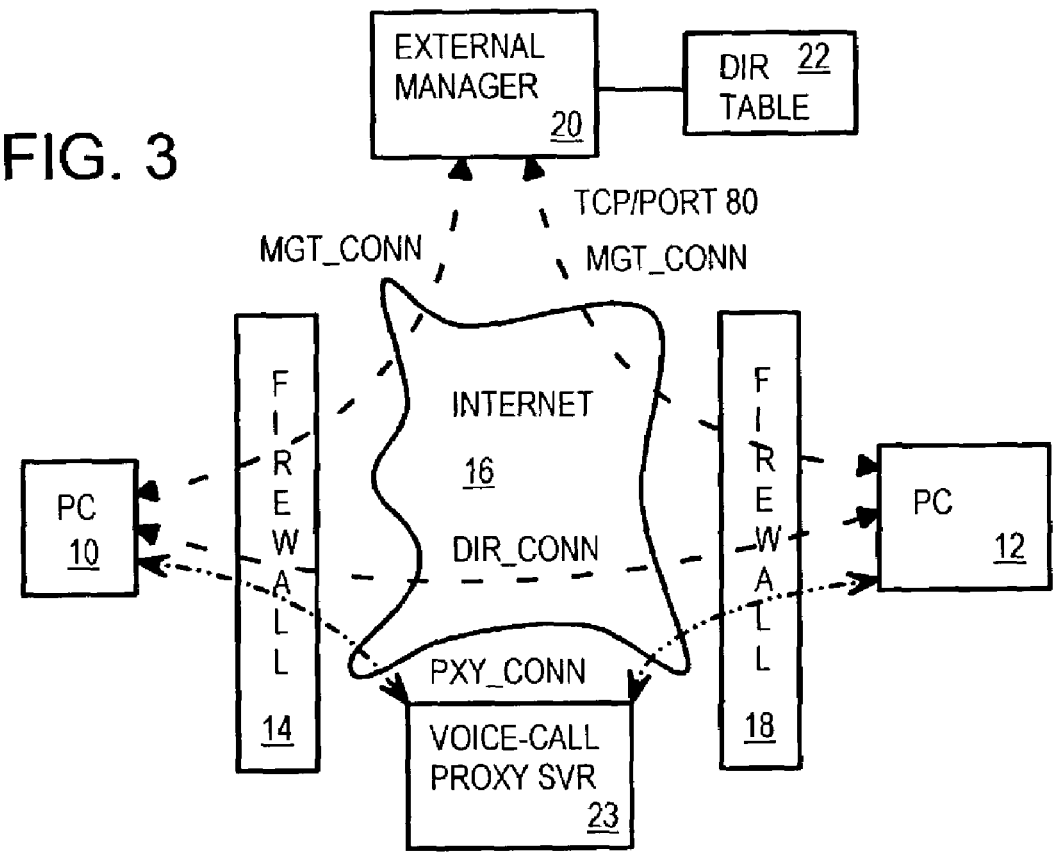
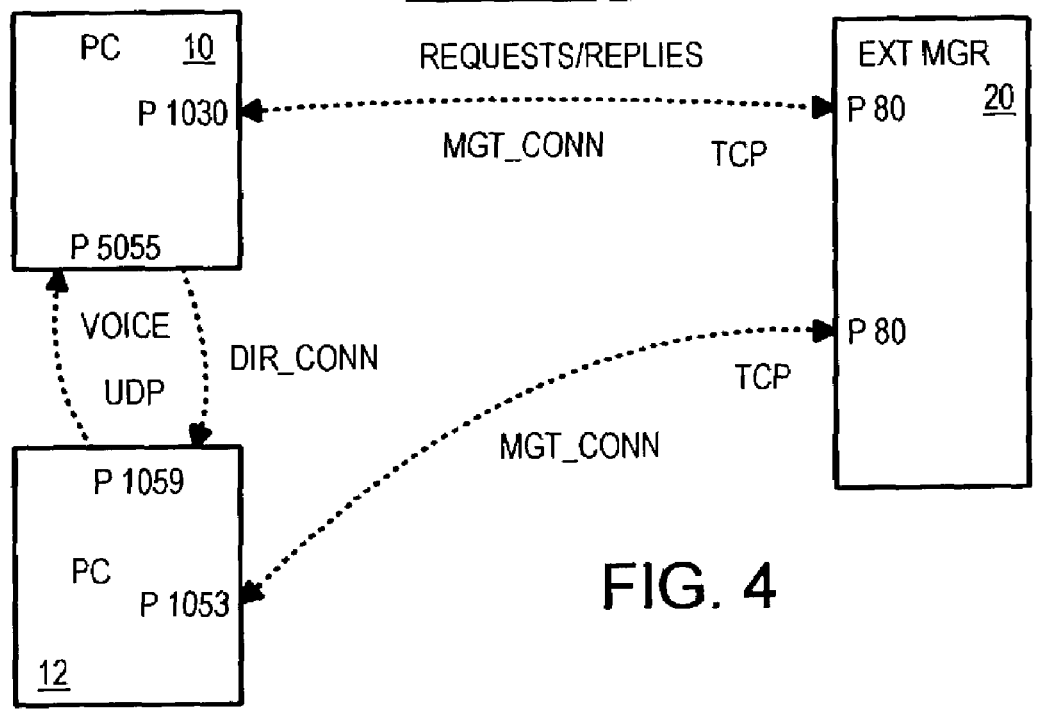

| CAPABILITY NUMBER | CAPABILITY NAME | DESCRIPTION |
|---|---|---|
| 1 | UDP OPEN | UDP IN,OUT ANY PORT |
| 2 | UDP OUT | UDP OUT ONLY, ANY PORT |
| 3 | UDP OUT 443 | UDP OUT ONLY, PORT 443 ONLY |
| 4 | TCP OPEN | TCP IN,OUT ANY PORT |
| 5 | TCP OUT | TCP OUT ONLY, ANY PORT |
| 6 | TCP OUT 80 | TCP OUT ONLY, PORT 80 ONLY |
| 7 | HTTP 80 | HTTP/TCP PORT 80 OUT ONLY |
| 8 | TCP OUT 443 | TCP OUT ONLY, PORT 443 |
| 9 | SSL 443 | SSL/TCP PORT 443 OUT ONLY |
| 10 | NAT | NETWORK ADDR TRANSLATION |
| 11 | PAT | PORT ADDR TRANSLATION |

FIG. 7

DIRECT TCP METHOD
234

VOICE-PROXY METHOD 240

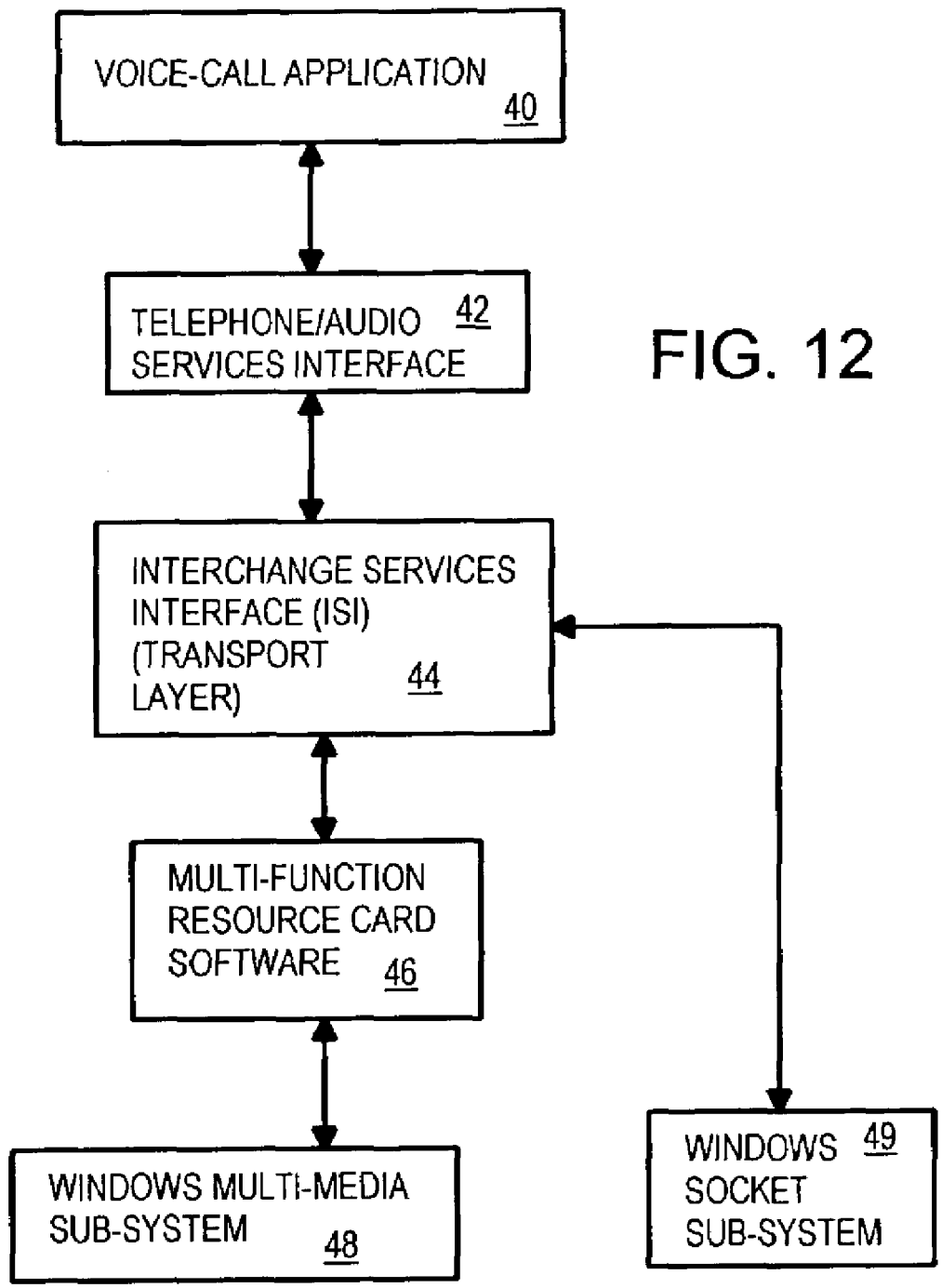

ADAPTIVE VOICE-OVER-INTERNET-PROTOCOL (VOIP) TESTING AND SELECTING TRANSPORT INCLUDING 3-WAY PROXY, CLIENT-TO-CLIENT, UDP, TCP, SSL, AND RECIPIENT-CONNECT METHODS

CROSS REFERENCE TO RELATED APPLICATIONS

This application is a continuation-in-part of the co-pending applications for Null-Packet Transmission from Inside a Firewall to Open a Communication Window for an Outside Transmitter, U.S. Ser. No. 09/682,084, filed Jul. 18, 2001, and Firewall-Tolerant Voice-Over-Internet-Protocol (VoIP) Emulating SSL or HTTP Sessions Embedding Voice Data in Cookies, U.S. Ser. No. 10/248,762, filed Feb. 14, 2002.

BACKGROUND OF INVENTION

This invention relates to Voice-over-Internet-Protocol (VoIP) software, and more particularly to testing and selecting communication methods through firewalls.

Internet-enabled communication includes electronic mail, web browsing, instant messaging, and video and audio streaming. Using the Internet to complete telephone calls is possible using voice-over-Internet-Protocol (VoIP) technology. Video messages may also be exchanged using enhancements to VoIP technology.

To protect local computers and networks from unauthorized use or even outright attack, various security measures can be taken. A barrier between a local network and the Internet is often employed. This barrier is known as a firewall since it protects internal networks from the ravages of the open Internet.

Firewall is a generic term that describes an array of different technologies for securing computer networks. Some common Firewall technologies are Packet Filters, Proxy Servers, Network Address Translation, Port Address Translation and Application Protocol Filtering. Firewalls can be implemented in routers, special firewall appliances, and bastion hosts at the connection point of two or more computer networks. Personal firewalls are a software application running on a personal computer.

Firewalls can operate on different levels of the network. FIG. 1 is a reference diagram for the Open Systems Interconnection (OSI) network model. Packets passing through a firewall can be filtered by examining their IP addresses, TCP ports, protocols, states, or other header criteria at network layer 3 or transport layer 4. These are known as packet-filtering firewalls.

Dynamic or stateful packet filters can operate on most of the layers. Only specifically-configured traffic is allowed through these more-restrictive firewalls, such as web-browser traffic that uses Transport-Control-Protocol (TCP) on port 80. Some firewalls check that standard hyper-text transfer protocol (HTTP) or secure-sockets layer (SSL) protocols are being followed.

All traffic from outside the firewall can be blocked except when a connection is opened from within the firewall. A temporary return path, opening, or window is created through the firewall for each connection initiated from the local network within the firewall. This window closes when the connection is closed.

For User Datagram Protocol (UDP), the temporary return path may be closed when no traffic has flowed through the Dynamic Packet Filter for a configurable time period. Some firewalls allow traffic flowing in either direction to reset the timer, while others allow only outbound packets to reset the timer.

Proxy servers can operate on layers 3, 4, or application layer 7. Clients behind the firewall connect to the proxy server, which then makes another connection to the final server. Application protocol filtering can also operate on layer 7. Presentation layer 6, and session layer 5 are between the sockets of layer 7 and the TCP connections of layer 4. Data link layer 2 encapsulates the data into the actual packets or frames transmitted over the physical layer 1.

Firewalls can interfere with some Internet applications, even preventing their use across firewalls. For example, VoIP applications can be blocked by firewalls. FIG. 2 illustrates how a firewall can block incoming UDP packets for a VoIP application. Personal computer PC 10 is protected by firewall 14, while server or PC 12 is directly connected to Internet 16.

Voice call applications prefer to use the more bandwidth-efficient UDP rather than TCP to stream audio. Separate ports can be used for each direction of the audio stream. For example, audio from the user at PC 10 can be sent over Internet 16 to port 5401 of PC 12 using the UDP protocol. Datagrams can pass through firewall 14 since they originate from within (inside) firewall 14.

The reverse-direction audio stream is sent from PC 12 to a different port 5885 of PC 10. However, when PC 12 attempts to stream audio back to PC 10, firewall 14 blocks the UDP datagrams. Firewall 14 sees these UDP datagrams as coming from Internet 16 without a request from within PC 10 the firewall. Firewall 14 blocks these UDP datagrams, assuming that they are unauthorized and possibly an attack on the local network.

While some firewalls such as personal firewalls can be configured to allow the incoming packets to enter from the outside Internet, most firewalls cannot be configured by ordinary users. While some standard-application traffic may be able to pass through firewalls, such as web traffic using TCP to port 80, other kinds of traffic such as UDP packets and for other arbitrary ports is often unconditionally blocked.

The parent application, Null-Packet Transmission from Inside a Firewall to Open a Communication Window for an Outside Transmitter, U.S. Ser. No. 09/682,084, filed Jul. 18, 2001, disclosed using null packets to open a window in a restrictive firewall that otherwise blocked incoming UDP packets. Another parent application Firewall-Tolerant Voice-Over-Internet-Protocol (VoIP) Emulating SSL or HTTP Sessions Embedding Voice Data in Cookies, U.S. Ser. No. 10/248,762, filed Feb. 14, 2002, disclosed a voice-proxy that forwarded VoIP voice data using HTTP or SSL messages.

A VoIP application is desired that can test and determine how restrictive any intervening firewall is. The VoIP application on the client or at a server can then select the most efficient communication method that can still pass through the firewall. A VoIP system that can test and select from among several different communication methods is desirable.

BRIEF DESCRIPTION OF DRAWINGS

FIG. 3 shows an external manager for setting up a communication channel through firewalls.

FIG. 4 is a diagram highlighting port connections using an external communication manager but direct voice connections.

FIG. 7 is a communication capabilities table for a VoIP client.

FIG. 12 is a block diagram of software and hardware components in a direct communication system on a client computer.

DETAILED DESCRIPTION

Figure 1:
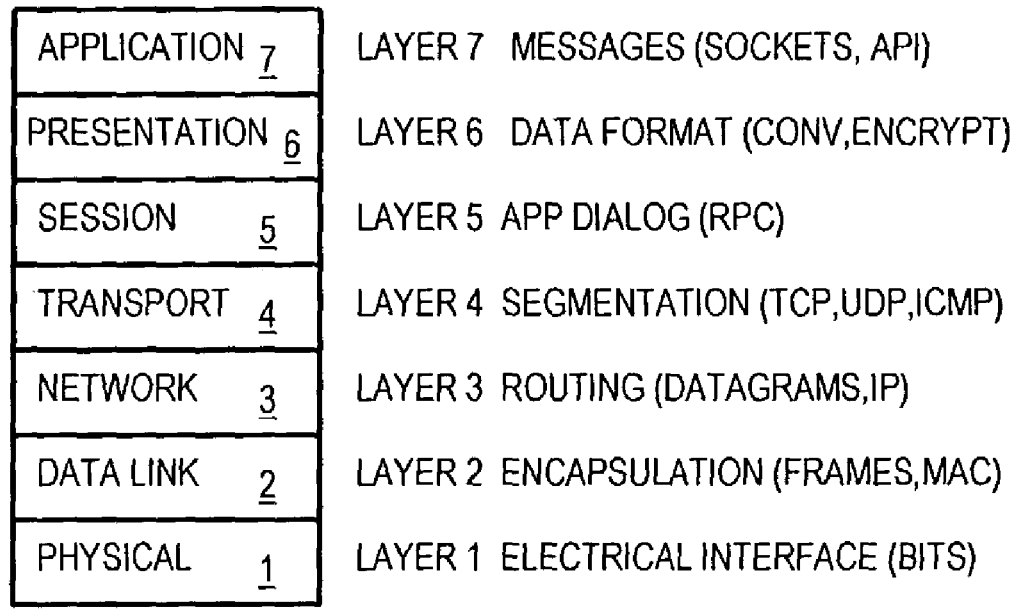
FIG. 1 is a reference diagram for the Open Systems Interconnection (OSI) network model.
Figure 2:
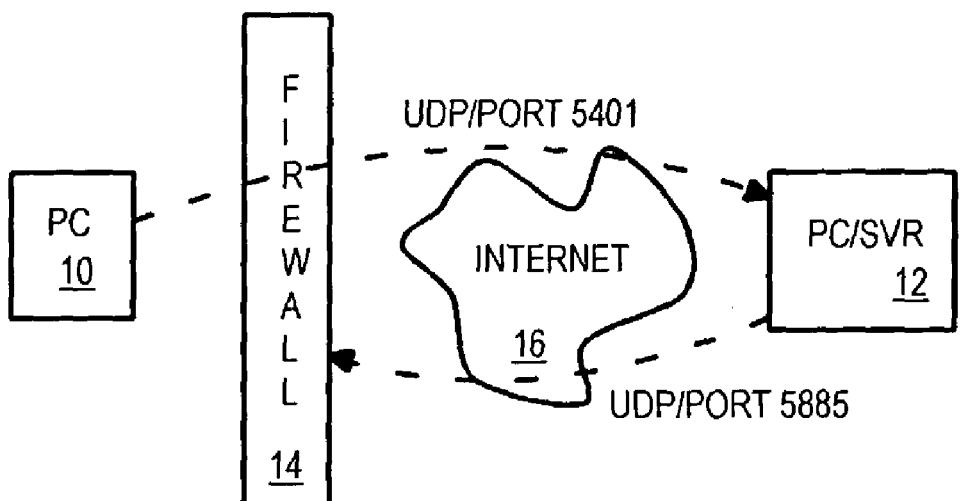
FIG. 2 illustrates how a firewall can block incoming UDP packets for a VoIP application.

The present invention relates to an improvement in Voice-over-Internet-Protocol (VoIP) systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FIG. 3 shows an external manager for setting up a communication channel through firewalls. PC 10 is on a local network protected by firewall 14, while server or PC 12 is on a local network protected by firewall 18. Firewalls 14, 18 filter packets or application-layer messages, translate addresses, act as proxy servers, or otherwise provide protection from Internet 16.

External manager 20 is on a server accessible from Internet 16. External manager 20 can be accessed through a web site that PC 10 and PC 12 each connect to. Since web browsers use the Transport-Control-Protocol (TCP) and port 80, firewalls 14, 18 are configured by default to allow incoming/outgoing TCP packets to and from port 80, although perhaps only when PC 10 or PC 12 first a packet out to external manager 20 and thus initiate a TCP connection from within the firewall. These connections to external manager 20 are management connections that typically carry status and call-setup information rather than voice data.

PC 10 and PC 12 first connect to external manager 20. External manager 20 registers each PC by storing addresses and ports for the PCs in directory table 22. Keep-alive messages are used to maintain the TCP connection.

When PC 10 attempts to initiate a call to PC 12, PC 10 uses TCP port 80 to send the call request to external manager 20. External manager 20 then searches for the address and port information for PC 12 in directory table 22. This information is used to send a message from external manager 20 to PC 12. PC 12 can open a connection when registering and then periodically send a keep-alive packet to external manager 20 to maintain the connection. External manager 20 acts as a third party message-passing service, telling both PC's 10, 12 which methods, addresses, and TCP or UDP ports to use.

A communication program such as VoIP prefers to make a direct connection using UDP between PC 10 and PC 12. This reduces latency and thus optimizes voice quality. When such a direct connection can be made between PC's 10, 12 through Internet 16, this method is usually preferred. A direct connection DIR_CONN can then be made to carry voice data. Management connections MGT_CONN can be maintained to external manager 20 for call status messages while the voice data is carried by DIR_CONN.

When either firewall 14, 18 is very restrictive, a direct connection between PC's 10, 12 may not be possible. Then a 3-way calling path may be established. Voice-proxy server 23 acts as a voice-data forwarding server. PC's 10, 12 each connect to voice-proxy server 23 using a standard web-browsing method such as HTTP or SSL. Voice data is embedded in HTTP or SSL messages passed to and from voice-proxy server 23 and forwarded to the other calling party. Thus proxy connections PXY_CONN are made to voice-proxy server 23 to carry the voice data.

External manager 20 can be a separate server than voice-proxy server 23, or can reside on the same server machine. Separate connections to external manager 20 can be maintained to carry management information while the proxy connections to voice-proxy server 23 carry the voice-call data. Either the direct connection DIR_CONN or the proxy connection PXY_CONN is made between PC clients, but usually not both at the same time.

FIG. 4 is a diagram highlighting port connections using an external communication manager but direct voice connections. PC 10 and PC 12 each register with external manager 20 by opening TCP connections to port 80 of external manager 20. This allows packets from external manager 20 to pass through any intervening firewalls. PC 10 and PC 12 can use different ports for making their connections, such as port 1030 and port 1053, or any port above 1023, as long as the external port is port 80 or port 443. Packets from external manager 20 can include call requests from other PC's.

When requested by external manager 20, PC 10 and PC 12 open a direct connection through their firewalls using ports specified by external manager 20. In this example, UDP port 5055 is used on PC 10, while UDP port 1059 is used by PC 12.

UDP packets are streamed between PC 10 port 5055 and PC 12 port 1059 through openings in the firewalls. Since UDP is more efficient at transferring voice data than TCP, a higher bandwidth is available for the call. UDP is more efficient than TCP because there is no 3-way handshake to establish a TCP connection (there is no formal "connection" for UDP), no check for losses, no re-transmission, and a lower packet-header overhead. A direct connection is made for the voice traffic, even though external manager 20 is used to initiate the call.

Figure 5:
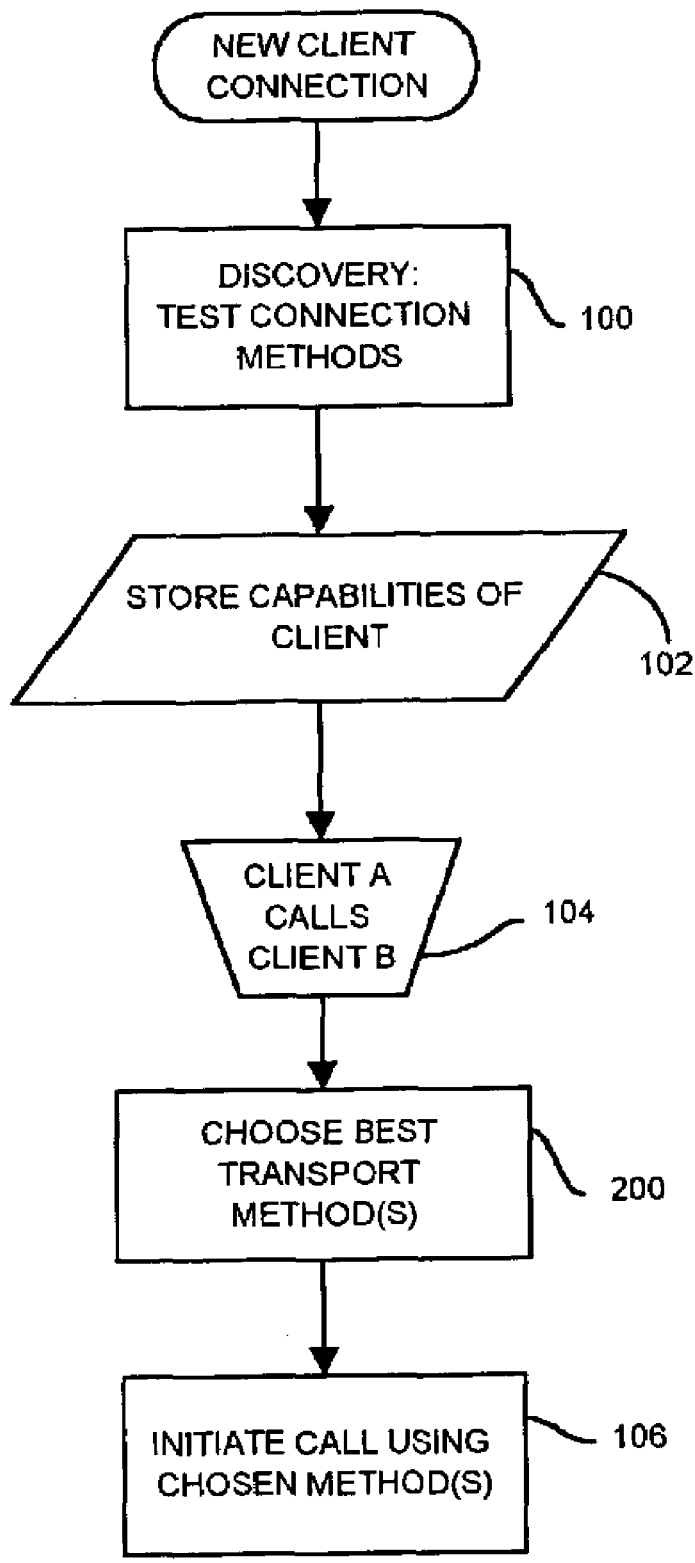
FIG. 5 is a flowchart of testing and choosing a transport method for a VoIP call.

FIG. 5 is a flowchart of testing and choosing a transport method for a VoIP call. When a new client PC connects to the external manager, a discovery process is performed. Discovery process 100 tests a variety of communication methods between the external manager and the client VoIP application on the caller's PC. Discovery process 100 is detailed in FIGS. 8A-D.

The results of discovery process 100 indicate the ports and protocols allowed to pass through a firewall that protects the client PC. These results are capabilities of the client PC that can be stored, such as by the external manager or locally on the client PC, step 102.

When the user of the client PC desires to make a VoIP call to another user, step 104, a message or request is sent over the management connection from the client PC to the external manager. External manager 20 examines the capabilities of all client PC's in the new call and chooses the best method for transporting the voice data, selection process 200. Selection process 200 is detailed later in FIGS. 9A-B. Each of the clients may then be notified of the method to use, and the clients can initiate a direct connection that bypasses the external manager, or a proxy connection to a voice-proxy server that forwards the voice data among the clients, step 106. The call can then be setup and voice data exchanged.

Figure 6:
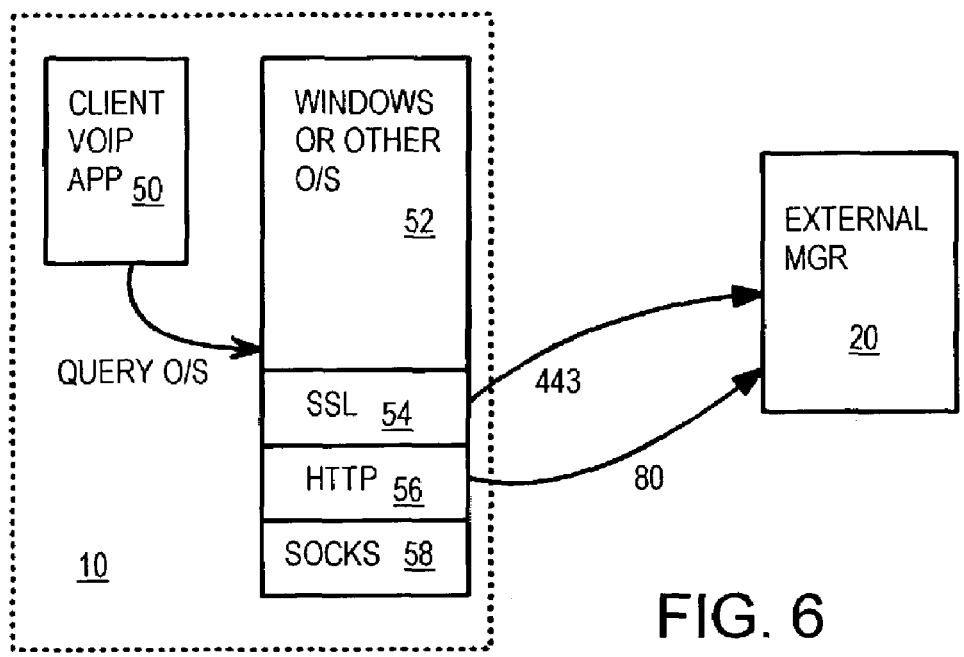
FIG. 6 shows a VoIP client application querying an operating system (O/S) to find available Internet proxy modules.

FIG. 6 shows a VoIP client application querying an operating system (O/S) to find available Internet proxy modules. VoIP client application 50 runs on PC 10 as a high-level application that the user can control. O/S 52 is a Windows, Linux, or other operating system and may include a variety of middleware layers. Several different communication services are often installed on PC 10.

Rather than directly connecting with the network, VoIP client application 50 can use proxy modules that handle the lower-level protocol formatting, packetization, and data handling. For example, SSL module 54 can be used to establish a secure connection to port 443 of external manager 20. HTTP module 56 can be used to establish and communicate over a web-browsing connection that uses the HTTP protocol and port 80.

SOCKS module 58 may be used to proxy all communications. When any of these proxy modules are detected by the queries to O/S 52, client application 50 may connect to these proxies to send and receive packets. Client application 50 can send the IP address of the external manager or the remote client to the proxy and allow the proxy to make a connection to the external manager or remote client. Proxies may perform address and port translation and may prevent UDP transport, but may be useful for TCP transport or to connect to a voice-proxy server that forwards voice data to the other client. Other kinds of proxies may pass UDP packets through with little change, but generate new TCP packets using the higher-level HTTP protocol.

FIG. 7 is a communication capabilities table for a VoIP client. The discovery process determines communication capabilities of a client. These capabilities can be categorized as shown in the table. More efficient methods tend to be located higher on the table than less efficient or more restrictive methods.

Capability 1 is "UDP Open", which indicates that the client can both send and receive UDP packets on any UDP port. When no firewall or proxies are present, the client is wide open and can use more efficient UDP for voice transport. When the client can send but not receive UDP packets on any port, capability 2, "UDP Out" is detected. Some firewalls allow outgoing UDP packets but block some incoming UDP packets. Other firewalls allow only port 443 to be used for outgoing UDP packets, which is indicated by capability 3, "UDP Out 443". Port 443 is used for secure web-browser connections by SSL sessions.

Capability 4 is "TCP Open", which indicates that the client can both send and receive TCP packets on any TCP port. Some permissive firewalls allow all TCP traffic. When the client can send but not receive TCP packets on any port, capability 5, "TCP Out" is detected. Some firewalls allow outgoing TCP packets but block some incoming TCP packets. Other firewalls allow only port 80 to be used for outgoing TCP packets, which is indicated by capability 6, "TCP Out 80". Port 80 is used for regular web-browser connections.

Some firewalls also perform application-layer filtering, such as checking that the HTTP or SSL protocols are being followed. Capability 7, "HTTP 80", indicates that the client's firewall also checks that the HTTP protocol is being followed, such as by looking for GET and RESPONSE HTTP messages and HTTP headers in the TCP packets to port 80. Incoming HTTP requests and incoming TCP packets not matched to an HTTP GET from the client may be blocked.

Some firewalls may also allow outgoing TCP packets to port 443, and responses that match an earlier request from the client. This is capability 8, "TCP Out 443". When the firewall checks for SSL headers on TCP packets for port 443, capability 9, "SSL 443", is detected.

Some firewalls or O/S proxies may change IP addresses. This is known as network-address-translation (NAT). When the client's IP address is changed, capability 10 "NAT" is detected. Other firewalls or proxies may change the TCP or UDP port number. This is known as port-address-translation (PAT), and when detected is indicated by capability 11, "PAT".

A client may possess more than one capability. For example, when capability 1, "UDP Open" is present, then capabilities 2 and 3 are also present. NAT or PAT could also be present with other capabilities. When no firewall or proxies are present, capabilities 1-9 may all be present.

FIGS. 8A-D detail the discovery process to detect communication capabilities and firewall or proxy restrictions. The client VoIP application attempts to establish a series of communications channels with the external manager using different ports and protocols. When the client successfully receives a reply packet from the external manager, the test indicates that that particular method is available as a communication capability, and the capability in the table can be set. When a query to the client's O/S detected a secure proxy module or the SOCKS module, these modules are used; otherwise the client generates the TCP or UDP packets for use during discovery process 100.

Figure 8A:
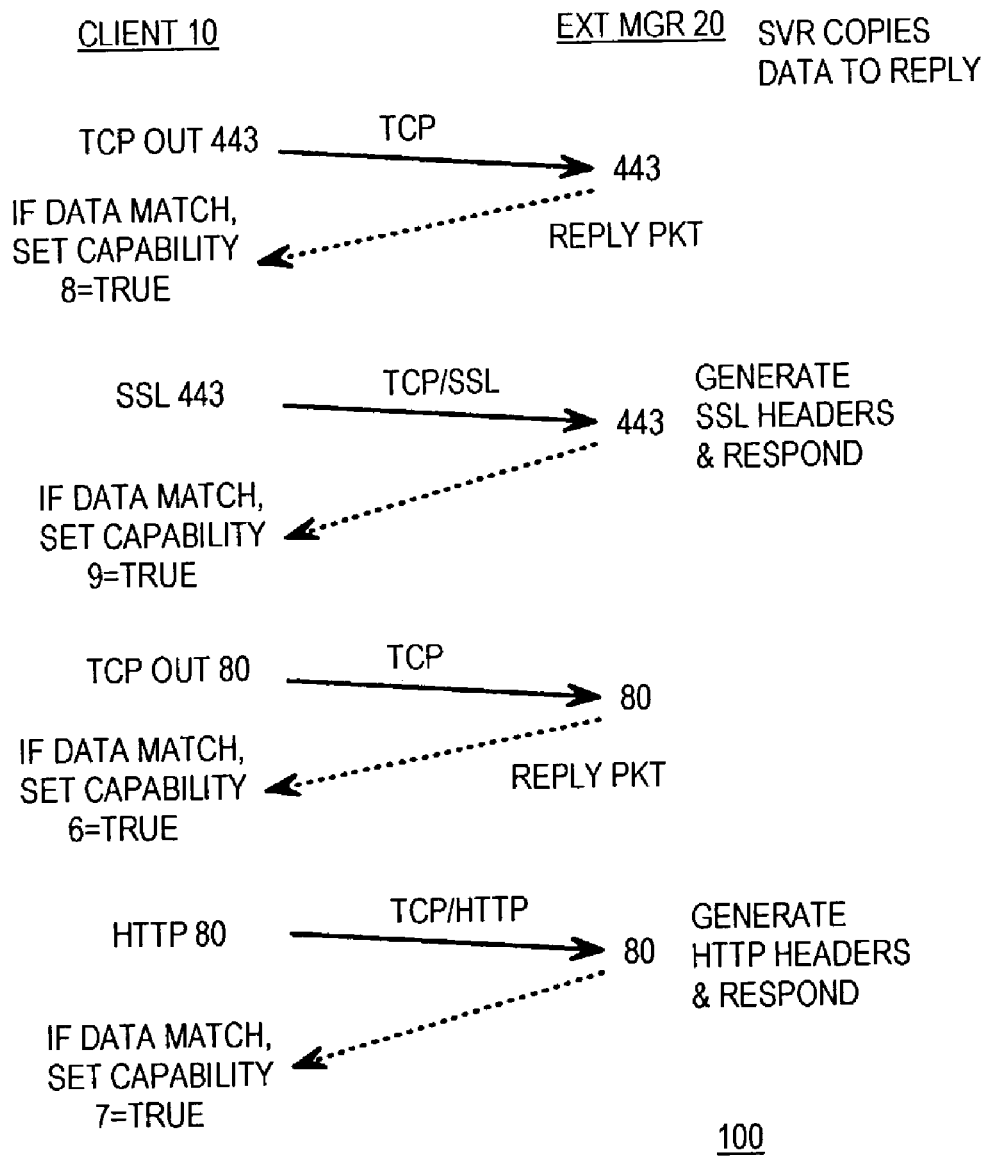
FIGS. 8A-D detail the discovery process to detect communication capabilities and firewall or proxy restrictions.

TCP capabilities are tested in FIG. 8A. The VoIP client on PC 10 sends a TCP packet to port 443 of the external manager. The external manager responds with a reply TCP packet back to the source port of the client PC. The external manager copies data in the client's TCP packet into the reply packet's data field. When the client receives this reply packet, the client compares the data in the reply packet to the data sent by the client. When the data matches, the capability test passes. Capability 8, "TCP Out 443" is set. The more restrictive capability 9, "SSL 443" is also set since SSL uses TCP/443 packets.

When the data mis-matches, or no reply is received, a firewall may be performing application-layer filtering. The client then adds SSL headers to the TCP packet that is sent to port 443 of the external manager. The external manager detects the SSL headers and generates a response packet that includes server SSL headers and the copied data. If this response is received by the client, and the data matches, then capability 9, "SSL 443" is set.

The VoIP client on PC 10 also sends a TCP packet to port 80 of the external manager. The external manager responds with a reply TCP packet back to the source port of the client PC. The external manager copies data in the client's TCP packet into the reply packet's data field. When the reply and sent data matches at the client, capability 6, "TCP Out 80" is set. The more restrictive capability 7, "HTTP 80" is also set since HTTP uses TCP/80 packets.

When the data mis-matches, or no reply is received, a firewall may be performing application-layer HTTP filtering. The client then adds HTTP headers to the TCP packet that is sent to port 80 of the external manager. The external manager detects the HTTP headers and generates a response packet that includes server HTTP headers and the copied data. If this response is received by the client, and the data matches, then capability 7, "HTTP 80" is set.

Figure 8B:
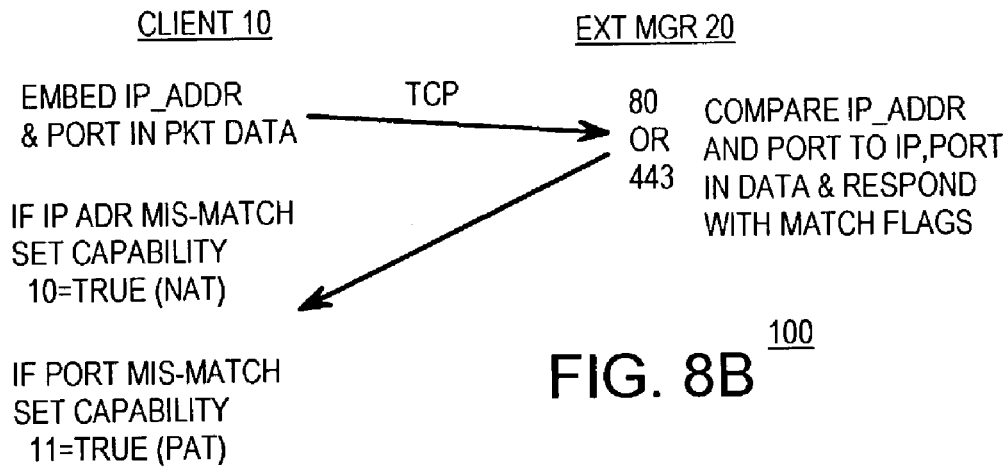

FIG. 8B shows a test for address and port translation. The client embeds its TCP port and IP address inside the data field of a TCP packet and sends the packet to port 80 or port 443 (or both) of the external manager. The external manager compares the IP address embedded in the packet's data field to the IP address in the packet's IP header. When the addresses do not match, network-address-translation (NAT) has occurred. Capability 10 is set.

The external manager also compares the TCP port embedded in the packet's data field to the TCP port in the packet's TCP header. When the ports do not match, port-address-translation (PAT) has occurred. Capability 11 is set.

Figure 8C:
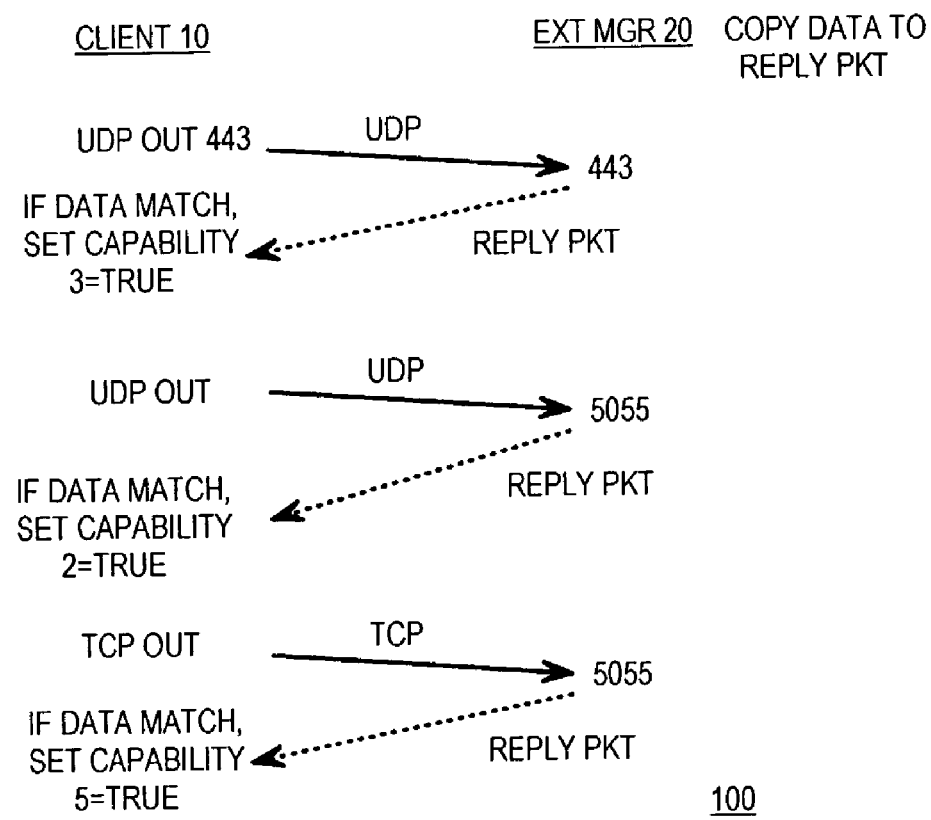

In FIG. 8C, UDP and TCP packets to arbitrary ports are tested. The client sends a UDP packet to the well-known port 443 of the external manager. The data in this packet is copied to a reply packet that the external manager sends back to the source port of the client. If the response is received by the client and the data matches, capability 3, "UDP Out 443" is set since the firewall passed outgoing UDP packets to port 443 and allowed an incoming reply to this UDP packet to pass through.

This test is repeated, but to an arbitrary UDP port of the external manager, such as UDP port 5055. If the firewall passes the response packet back and the data matches, capability 2, "UDP Out" is set since the firewall allows outgoing UDP packets to arbitrary ports.

Communication with an arbitrary TCP port is also tested. The client generates a TCP packet to arbitrary port 5055 of the external manager. If the firewall passes a TCP response packet back and the data matches, capability 5, "TCP Out" is set since the firewall allows outgoing TCP packets to arbitrary ports.

Rather than port 5055, other arbitrary ports can be used, but not well-known ports 80, 443. Additional arbitrary ports may be tested, although a firewall typically will allow any arbitrary port to be used if the firewall allows a randomly-selected one of the arbitrary ports to be used.

Figure 8D:
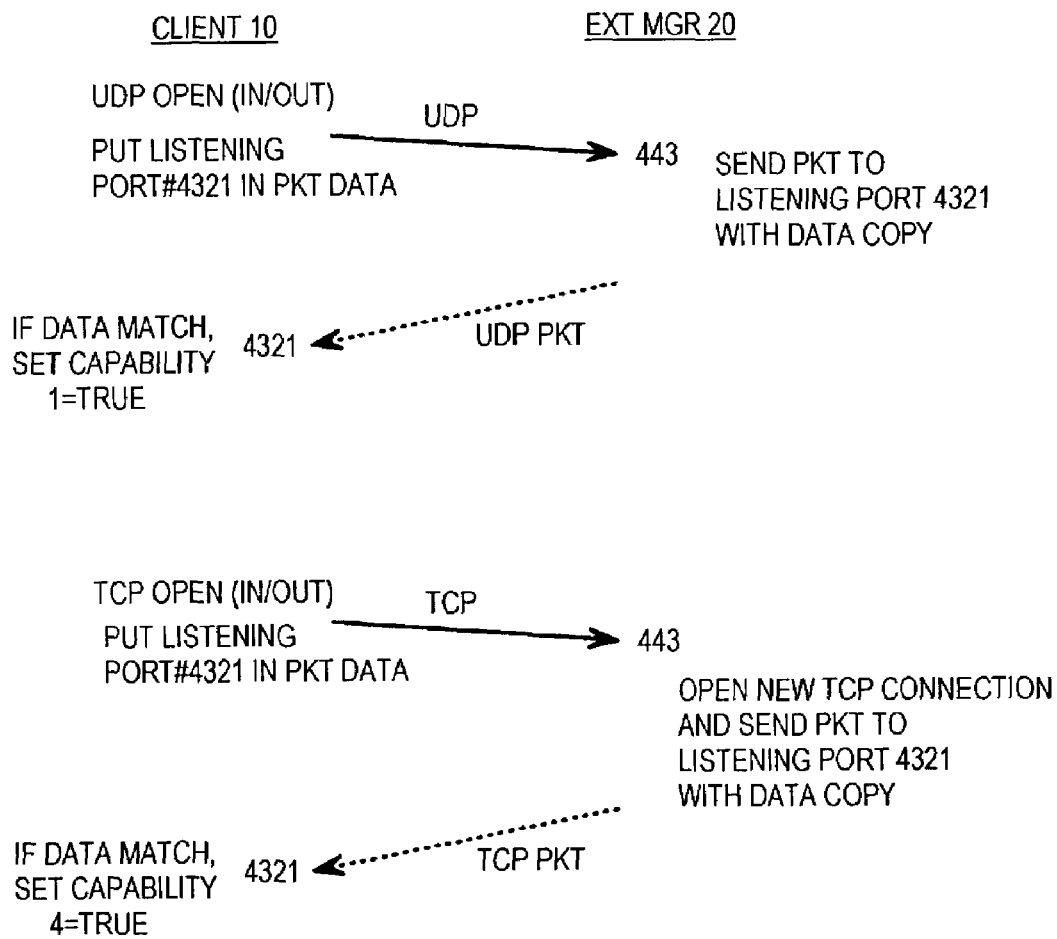

In FIG. 8D, incoming connections are tested. These are perhaps the most difficult tests since many firewalls do not allow incoming packets to pass through, unless the incoming packet is a reply to an earlier outgoing packet.

The client embeds a listening port number inside the data of a UDP packet that is sent from the client's port 5454 to port 443 of the external manager. The client's listening port (4321) is not the same port as the client's sending port (5454) for UDP packet. The listening port number on the client can be an arbitrary UDP port that has not been recently used by the client for other connections, such as UDP port 4321.

The external manager copies any data in the UDP packet from the client to a new UDP packet that is sent to the listening port number of the client. The new packet is not a reply to the packet sent by the client but is a new packet with a different client port, and perhaps a different server port. Thus the firewall has no window open for this listening port from an earlier connection, since different client port numbers were used.

The client listens for a UDP packet on the listening port. If the UDP packet is received by the client, and the data matches, the client's firewall allows incoming UDP packets. Capability 1, "UDP Open" is set.

The difference between capability 1, "UDP Open", and capability 2, "UDP Out", is that incoming UDP packets can be received by the firewall that do not correspond to any packets that were earlier sent by the client. The firewall is in a sense allowing the client to act as a server when receiving the incoming connection.

To test for an incoming TCP connection, the client opens a TCP connection to the server and embeds a listening port number inside the data of a TCP packet that is sent to port 443 of the external manager. The external manager opens another TCP connection to the listening port of the client and copies any data to a new TCP packet that is sent over this new TCP connection to the listening port of the client.

The client's listening port number can be an arbitrary TCP port that has not been recently used by the client for other connections, such as TCP port 4321. The listening TCP port can be the same or different from the listening UDP port. Thus the firewall has no window open for this listening port from an earlier connection.

The client listens for a TCP packet on the listening port. If the TCP packet is received by the client, and the data matches, the client's firewall allows incoming TCP packets and incoming TCP connections. Capability 4, "TCP Open" is set.

The difference between capability 4, "TCP Open", and capability 5, "TCP Out", is that incoming TCP connections from outside the firewall are allowed. The incoming TCP connection does not correspond to any TCP packets that were earlier sent by the client. The firewall is in a sense allowing the client to act as a server when receiving the incoming TCP connection.

Figure 9A:
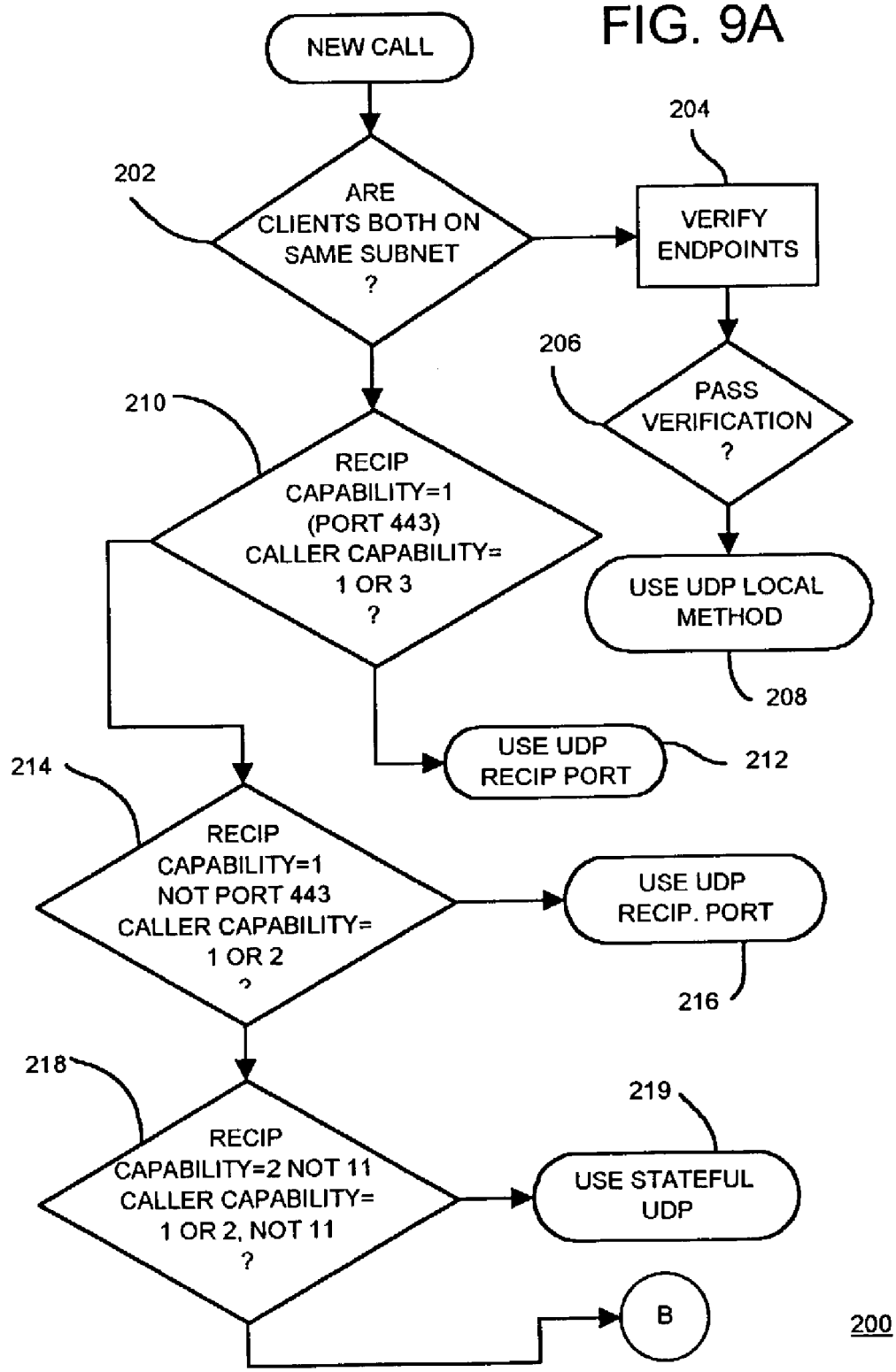
FIGS. 9A-B show a voice-transport-method selection process.
Figure 9B:
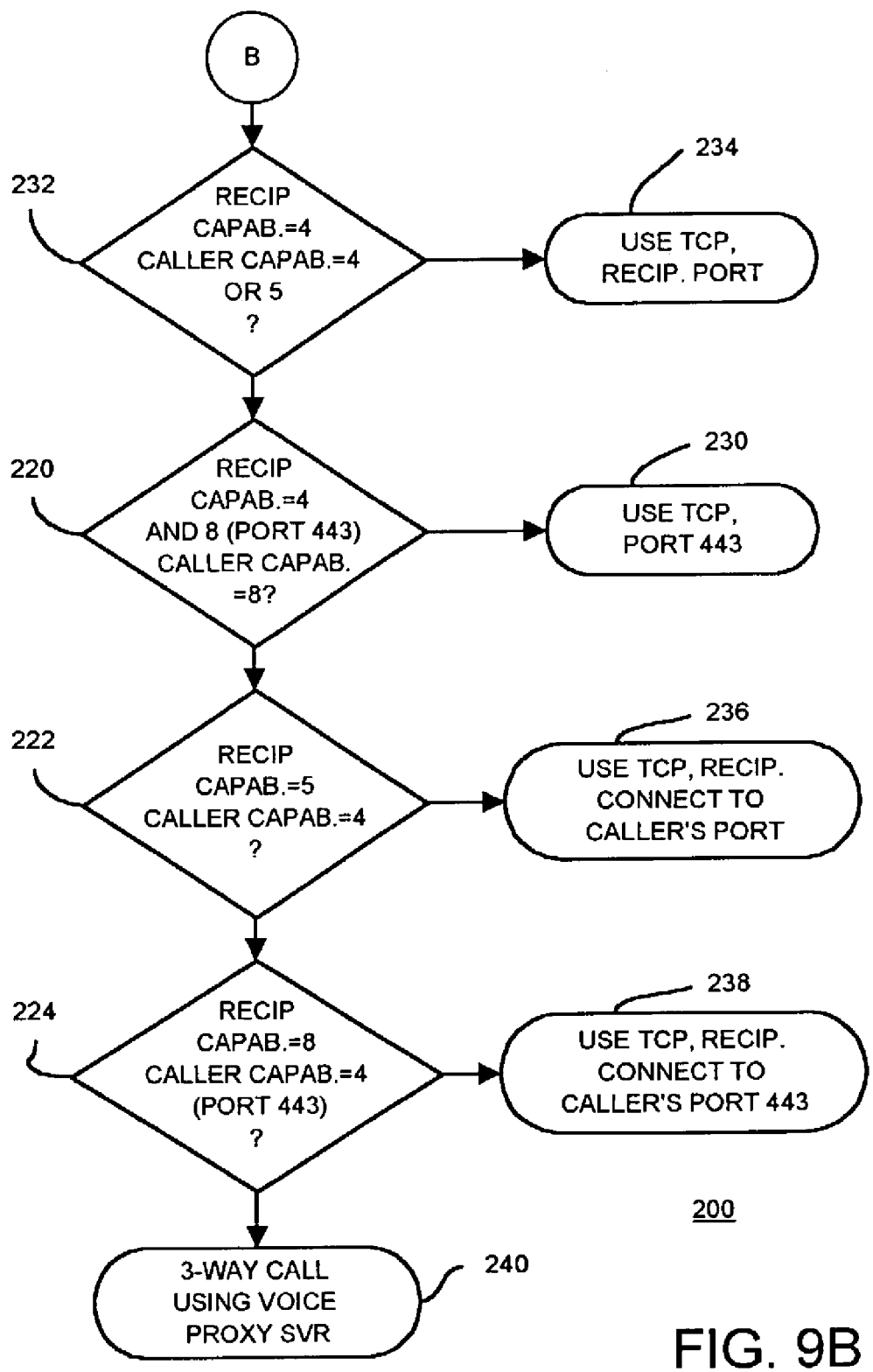

Selection of Method—FIGS. 9A-B

Once the discovery process has been performed for both clients to a call, the optimal transport method for these two clients can be selected. When one of the clients signals to the external manager that a new call is desired, the external manager compares the capabilities of the two clients.

A waterfall method for selection of the optimal transport method is used. The external manager starts with the most efficient transport method and continues down the list with less-efficient methods until a match is found. The least-efficient transport method is chosen when none of the other methods are available on both clients. The external manager sends information on the method selected to each client using the management connection. Then the clients open a direct or proxy connection using the selected method to transport the voice data.

The transport methods are (in decreasing order of efficiency):

Local UDP
UDP
Stateful UDP
TCP
TCP Recipient Connect
Voice Proxy

FIGS. 9A-B show a voice-transport-method selection process. For selection process 200, the external manager first compares the local addresses of the two clients. The upper bits of the IP address can be compared, such as the three upper digits, since these are often the same for nodes on the same local network. Clients having IP addresses 155.37.2.1 and 155.37.2.99 may be on the same local network and can communicate with each other without passing through a firewall. When the clients are on the same local network, step 202, then the call can be made locally without passing through the open Internet. Often no firewall is between the two clients, so the most optimal method, UDP, can be used.

Since the IP addresses inside a local network may be aliased, and the same local IP address used by many computers on different networks, it is possible that the two clients are not really on the same local network but only appear to be. Endpoint verification test 204 is performed to test that the clients are on the same local network. The external manager instructs one client to send a message to the other client using the other client's IP address. The other client sends a response that includes a user identifier for the other client, such as a VoIP user name. If the VoIP user name is the desired calling party, then the endpoint is verified, step 206. The UDP local method is used, transport method 208 (FIG. 10B).

The UDP local method is used regardless of the capabilities detected during the discovery process, since the discovery process sent packets over the open Internet and possibly through one or more firewalls. These firewalls are not present within the local network, and thus the discovered capabilities do not reflect communication capabilities within the local network.

When the two clients are not on the same local network, step 202, then the capabilities of each client are examined in detail. When the recipient client has capability 1 (UDP open), and the calling client has capabilities 1 or 3, step 210, then the UDP method is selected, with UDP port 443 used, transport method 212 (FIG. 10A but using port 443 as the recipient's port).

Figure 10A:
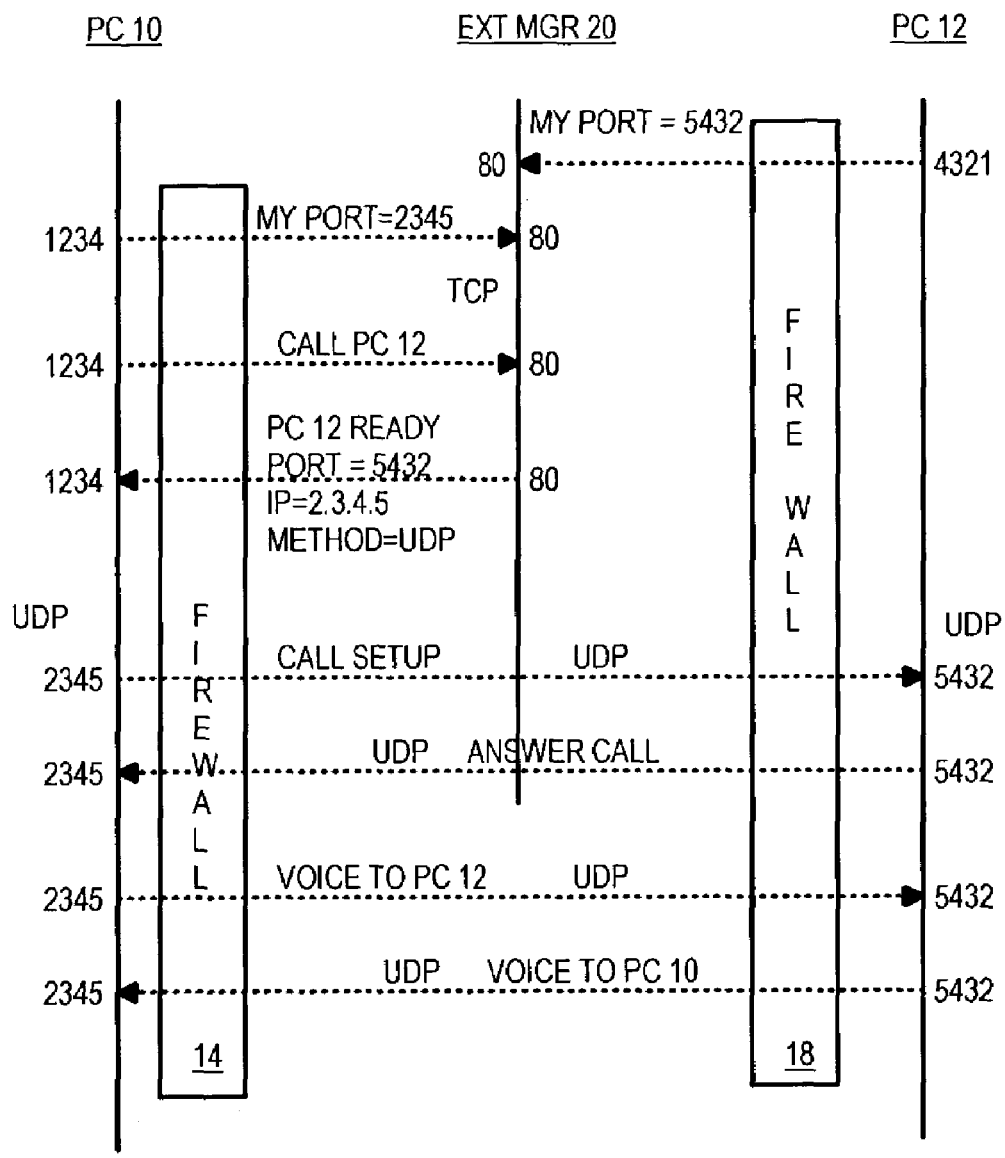
FIG. 10A is a diagram of the UDP transport method showing messages sent and connections made among the PC's and the external manager.
Figure 10B:
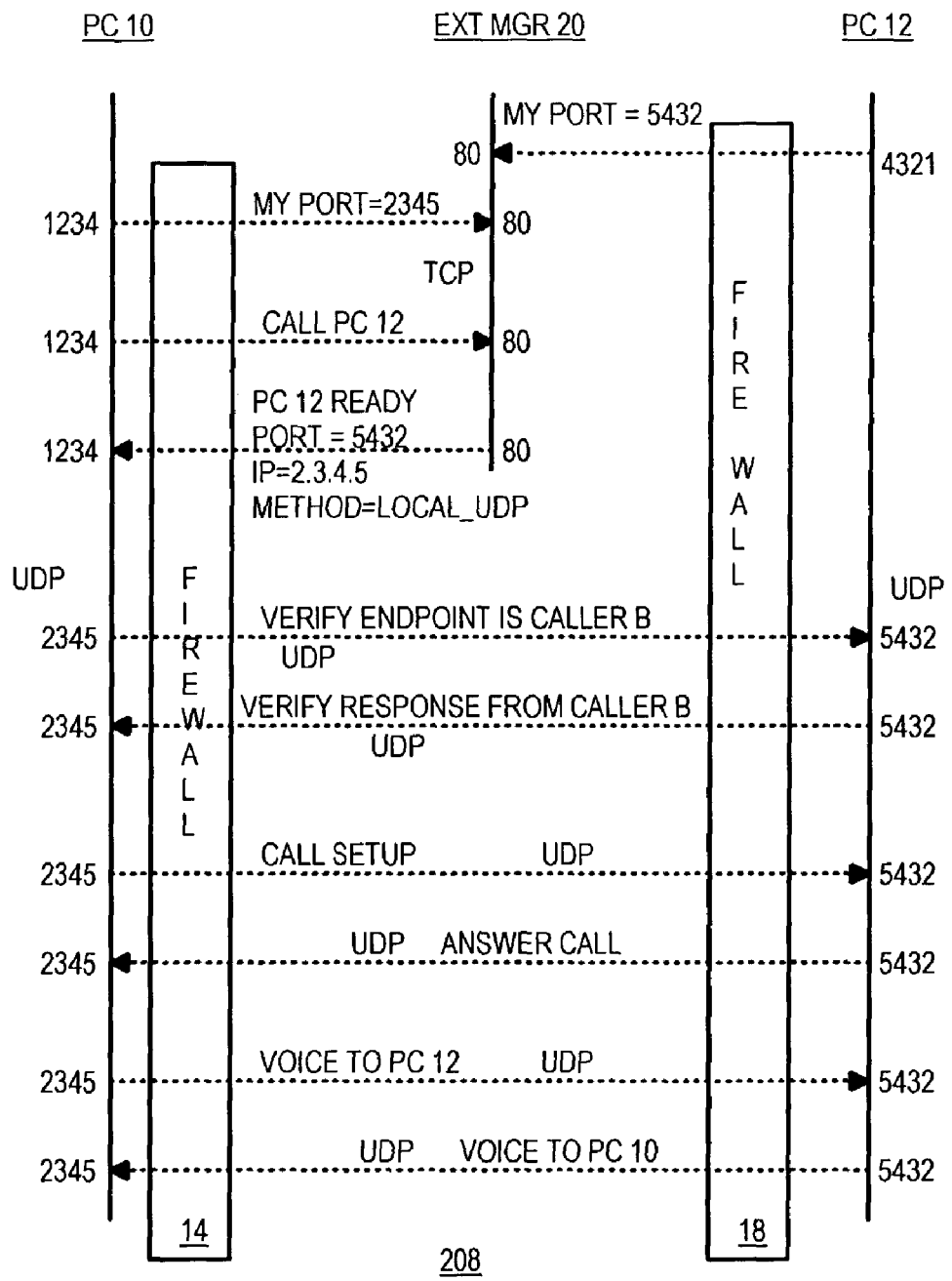
FIG. 10B is a diagram of the local UDP transport method.

When the recipient client has capability 1 (UDP open), and the calling client has capabilities 1 or 2 (UDP Open or UDP Out), step 214, then the UDP method is selected, with a the recipient's arbitrary UDP port used, transport method 216 (FIG. 10A). The recipient is not using port 443 for UDP, but can accept incoming UDP packets from the calling client on an arbitrary (non-protocol) port. The recipient port was sent to the external manager during registration and passed on to the calling client. The recipient client selects which arbitrary port to use to avoid conflicts with other programs. The calling client may or may not be able to accept incoming UDP packets without first sending out a UDP packet, so the calling client first initiates the UDP exchange to be sure. The first UDP packet is sent by the calling client, creating a window in its firewall, if needed, that allows passage of return UDP packets from the recipient client.

Figure 10C:
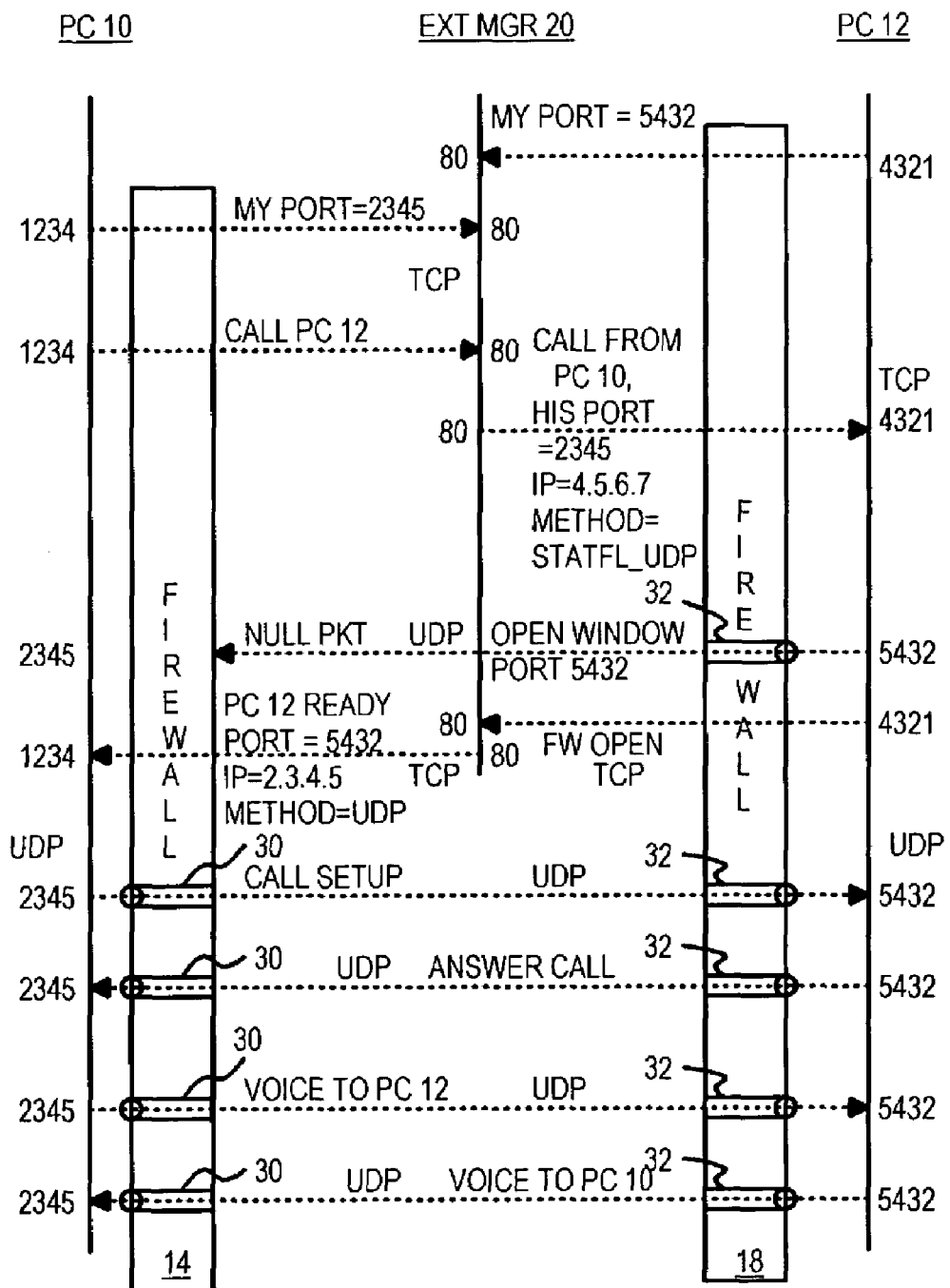
FIG. 10C is a diagram of the stateful UDP transport method that sends a null UDP packet to open a window in the firewall.

When the recipient client has capability 2 (UDP Out), and the calling client has capabilities 1 or 2 (UDP Open or UDP Out), step 218, and neither client has port-address translation, capability 11, then the stateful UDP method is selected, with the caller's and recipient's registered UDP port used, transport method 219 (FIG. 10C). Earlier capabilities could not have port-address-translation since they were UDP open capabilities.

The recipient can select an arbitrary UDP port during registration but cannot accept incoming UDP packets from the calling client. The calling client may or may not be able to accept incoming UDP packets without first sending out a UDP packet. The recipient client must initiate the UDP exchange by sending a null UDP packet. The null UDP packet is sent by the recipient client to the calling client's registered port, creating a window in the recipient client's firewall that allows passage of return UDP packets from the calling client.

Continuing onto FIG. 9B, the more efficient UDP methods cannot be used. When the recipient client has capability 4 (TCP open) and the caller has capability 4 or 5 (TCP open or TCP Out), step 232, then the caller can initiate but not receive the call. Thus the caller initiates the calling connection using TCP to the recipient's registered port, transport method 234 (FIG. 10D, but using port 443 of recipient PC 12).

Figure 10D:
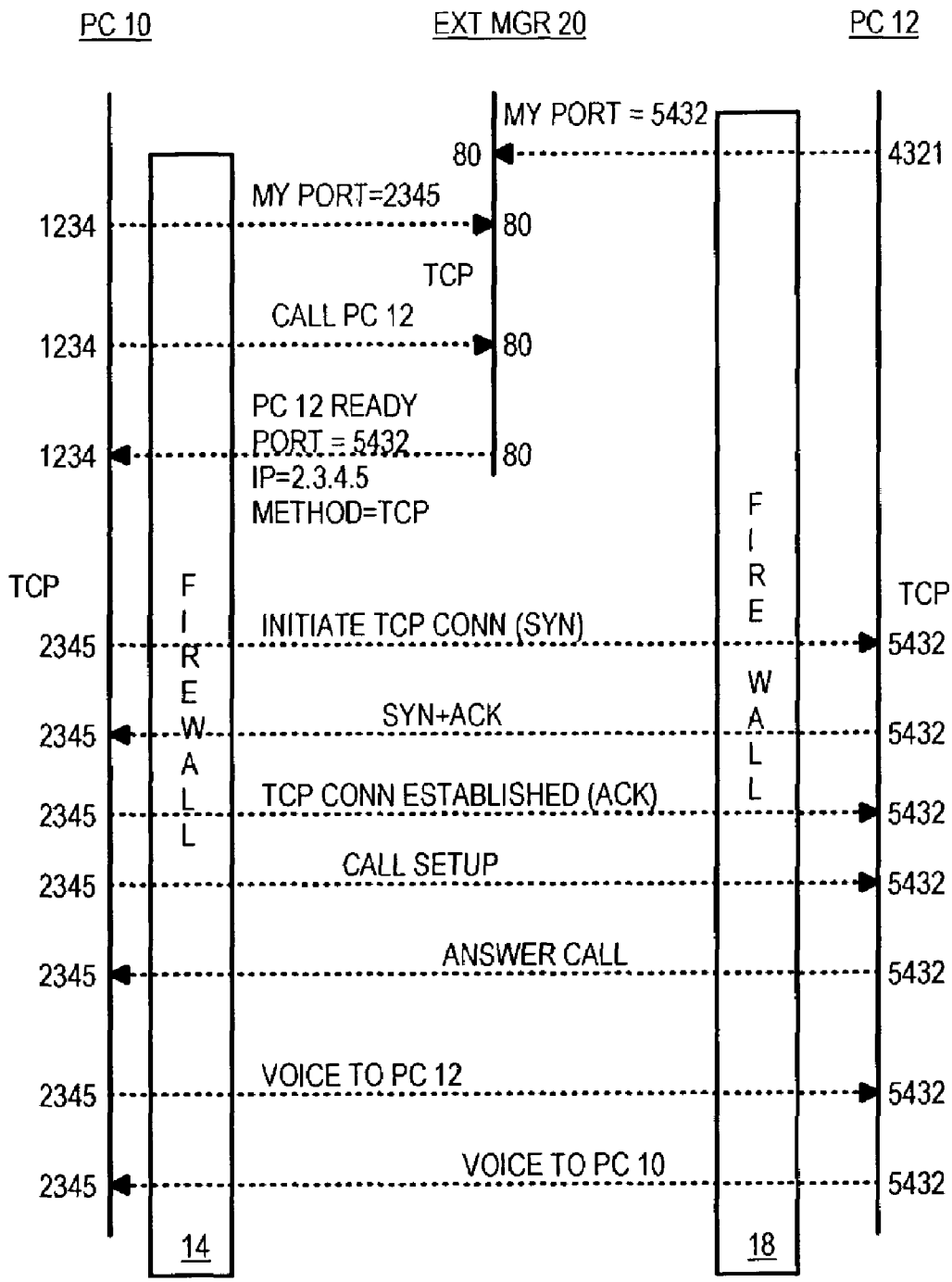
FIG. 10D shows a direct TCP transport method.

When the recipient client has capability 4 and 8 (TCP open and TCP Out port 443) and the caller has capability 8 (TCP Out-Only Port 443), step 220, then the caller can initiate but not receive the call. Thus the caller initiates the calling connection using TCP on port 443, transport method 230 (FIG. 10D but using port 443 of recipient PC 12).

Figure 10E:
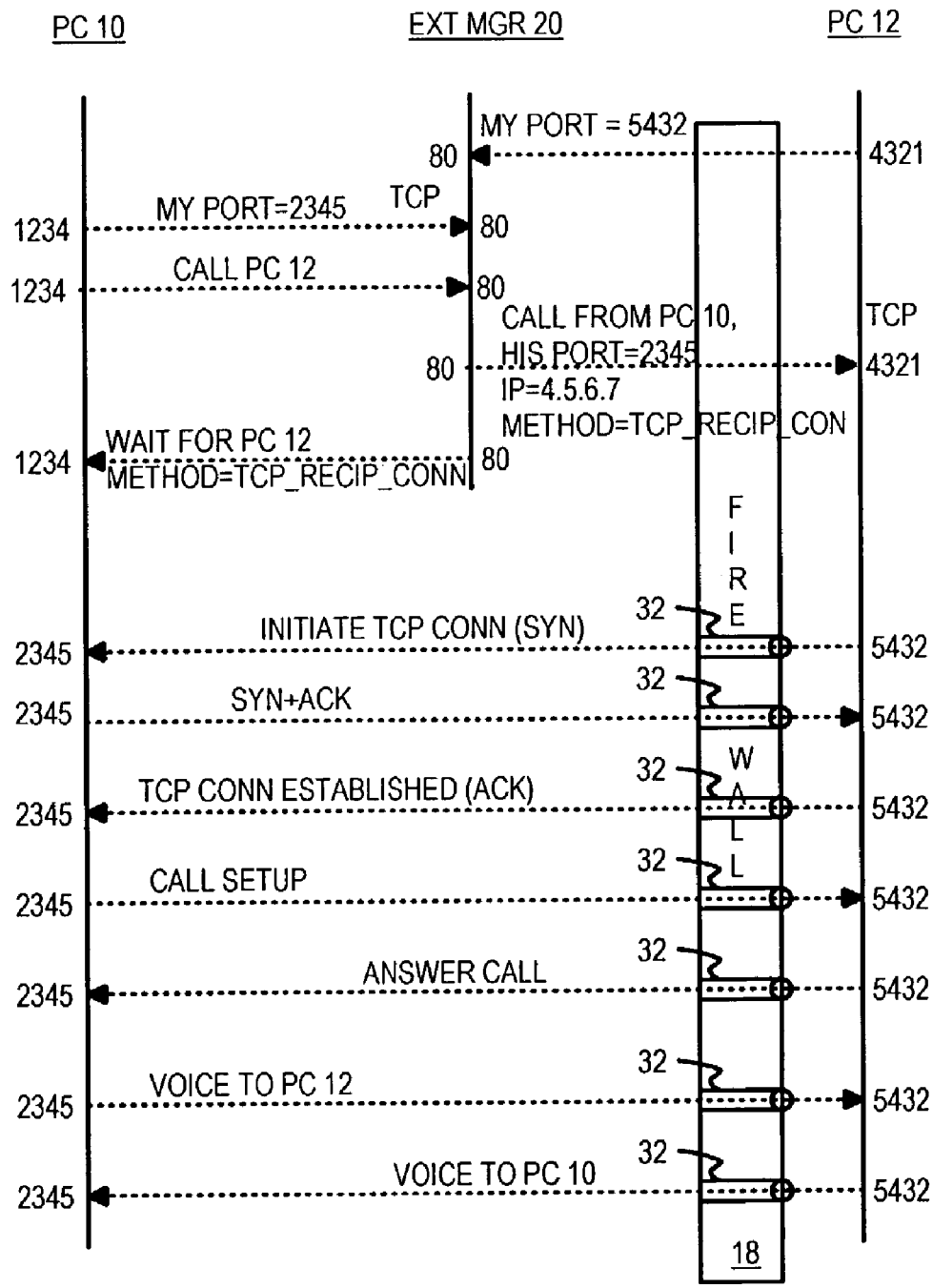
FIG. 10E shows a TCP Recipient-Connect transport method.

When the recipient client has capability 5 (TCP Out-Only) and the caller has capability 4 (TCP open), step 222, then the recipient can initiate but not receive the call. Thus the recipient initiates the calling connection using TCP to the caller's registered TCP port, which is an arbitrary port, TCP recipient-connect transport method 236 (FIG. 10E). The caller returns TCP packets to the recipient's TCP port that the recipient used for the connection.

When the recipient client has capability 8 (TCP Out-Only Port 443) and the caller has capability 4 (TCP open), step 224, then the recipient can initiate but not receive the call. Thus the recipient initiates the calling connection using TCP on port 443, using TCP recipient-connect transport method 238 (FIG. 10E but using port 443 of calling client PC 10). The caller sends TCP packets back to the recipient's TCP port that the recipient used for the connection.

Figure 10F:
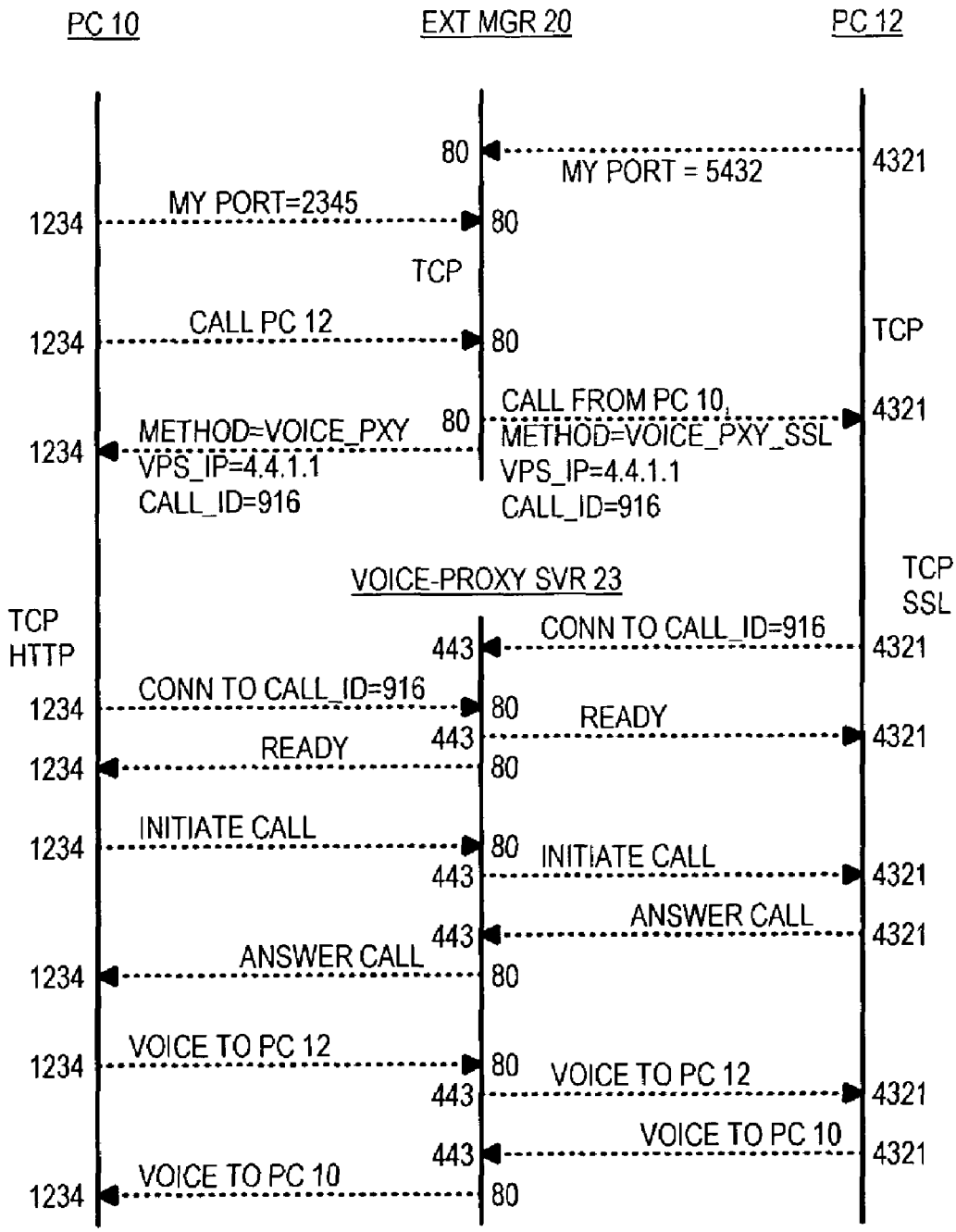
FIG. 10F shows a voice-proxy transport method.

When none of the earlier transport methods have been selected, then the least-optimum method is used. A 3-way communication path using proxy connections to the voice-proxy server are used, proxy-transport method 240 (FIG. 10F).

Transport Methods—FIGS. 10A-F

FIG. 10A is a diagram of the UDP transport method showing messages sent and connections made among the PC's and the external manager. External manager 20 receives registration requests from various locations on the Internet, including PC 10 and PC 12. PC 12 opens a TCP connection to port 80 of external manager 20. The local UDP port that PC 12 uses for direct communication with another PC is sent to external manager 20. In this example, the local UDP port is 5432.

Likewise, PC 10 registers with external manager 20 by opening a TCP connection to port 80, and sending its local UDP port, 2345. The UDP ports can be arbitrary ports and are sent along with other configuration information. Using arbitrary UDP ports allows for greater configuration flexibility and avoidance of conflicts with other programs running on a PC that may use UDP ports.

Since a TCP connection to port 80 is made to external manager 20, these request packets can pass through any local firewalls that protect PC 10 or PC 12. As long as the PC's can browse the web, which uses TCP/80, the PC's can access external manager 20. Reply packets from external manager 20 can also pass through the firewalls through windows that are automatically set up by the firewall when the PC first connects with external manager 20.

When the user at PC 10 wishes to communicate with the user at PC 12, a call-setup request is sent to external manager 20 using the management TCP connection. The same TCP ports are used, in the same connection as the registration. In this example the call request is contained in packet or packets that are sent to TCP port 80 from port 1234 of PC 10. The call request from PC 10 identifies PC 12 as the called party.

External manager 20 searches its directory table for more information on the called party, PC 12, and finds its IP address and TCP port (4321). The capabilities of the caller, PC 10, and recipient, PC 12 are compared using the selection process, and the optimal transport method determined. In this example, UDP transport method 216 is selected since both clients can accept arbitrary UDP packets.

External manager 20 sends a reply to PC 10, indicating that PC 12 is ready to stream UDP packets. The reply can contain the IP address of PC 12, the UDP port that PC 12 uses, port 5432, and the transport method to use (UDP). This reply is sent from TCP port 80 of external manager 20 to TCP port 1234 of PC 10, and can pass through firewall 14, as it appears to be standard web traffic.

PC 10 can now initiate a direct connection with PC 12 using high-bandwidth UDP packets. PC 10 sends its first UDP packet with call setup information for the receiving VoIP application from its port 2345 to port 5432 of PC 12. PC 12 reads PC 10's IP address and UDP port and responds with a UDP packet containing call-answering information for the calling VoIP application.

Additional UDP packets containing voice data for the call are sent from PC 10 using UDP packets to port 5432 of PC 12. PC 12 also sends UDP packets with the recipient user's voice to reach port 2345 of PC 10. The voice data is efficiently carried by the UDP packets since UDP headers are small and binary encoding of the voice data can be used.

FIG. 10B is a diagram of the local UDP transport method. PC 10 and PC 12 register with external manager 20 using TCP port 80 as described earlier. When PC 10 requests a new call, external manager 20 finds recipient client PC 12 and compares the transport capabilities of the two clients to find an optimal transport method. In this example, local UDP transport method 208 is selected.

External manager 20 sends a reply TCP packet to PC 10 with the IP address of PC 12, the UDP port of PC 12, and the transport method (local_UDP). PC 10 first verifies that the local endpoint is the intended PC 12 rather than another aliased local address. PC 10 sends a UDP packet to port 5432 of PC 12 using the IP address of PC 12 and its local address.

If the local address really is PC 12, then PC 12 responds with a verification response in a UDP packet back to port 2345 of PC 10. The verification response can include identification information of user B on PC 12, such as a VoIP user name.

The VoIP call can be setup once endpoint verification has passed. If endpoint verification fails, external manager 20 can select a different transport method. Call setup information is exchanged between PC 10 and PC 12. Then voice data can be streamed inside UDP packets exchanged between PC 10 and PC 12.

FIG. 10C is a diagram of the stateful UDP transport method that sends a null UDP packet to open a window in the firewall. External manager 20 receives registration requests from PC 10 and PC 12. PC 10, 12 each opens a TCP connection to port 80 of external manager 20. The local UDP port (5432) that PC 12 uses for direct communication with another PC is sent to external manager 20. Likewise, PC 10 registers with external manager 20 by opening a TCP connection to port 80, and sending its local UDP port, 2345.

Since a TCP connection to port 80 is made to external manager 20, these request packets can pass through any local firewalls that protect PC 10 or PC 12. As long as the PC's can browse the web, which uses TCP/80, the PC's can access external manager 20. Reply packets from external manager 20 can also pass through the firewalls through windows that are automatically set up by the firewall when the PC first connects with external manager 20. For the most restrictive firewalls, PCs 10, 12 could use port 80, but many firewalls allow other arbitrary TCP ports to be used, such as TCP port 1234 for PC 10 and TCP port 4321 for PC 12.

When the user at PC 10 wishes to communicate with the user at PC 12, a call-setup request is sent to external manager 20. The same TCP ports are used, in the same management connection as the registration. In this example, the call request is contained in packet or packets that are sent to TCP port 80 from port 1234 of PC 10. The call request from PC 10 identifies PC 12 as the called party.

External manager 20 compares capabilities of PC's 10, 12 and selects a transport method, such as stateful UDP transport method 219. External manager 20 searches its directory table for more information on the called party, PC 12, and finds its IP address and TCP port (4321). External manager 20 sends a call notification request to this port of PC 12 using the management TCP connection. This call notification includes the UDP port of the calling party (port 2345), as well as its IP address and the transport method (STATFL_UDP). The request may include other information or commands, such as a command to send a null packet to open a window in its firewall 18.

PC 12 may need to periodically open a new TCP connection to external manager 20, or may need to periodically send another TCP packet, keeping the connection open, to allow the request from external manager 20 to pass through its firewall 18. For example, PC 12 can send a TCP packet every minute to external manager 20. Less restrictive firewalls may not require the periodic packet transmission from inside firewall 18.

Null Packet Opens Firewall Window

PC 12's firewall 18 rejects incoming UDP packets that are not in response to an earlier UDP packet from PC 12. A window in firewall 18 must be opened to allow incoming UDP packets from PC 10 to pass through firewall 18 to PC 12. A null UDP packet is transmitted from PC 12 to PC 10 to open window 32 in firewall 18. The null packet is sent from UDP port 5432 of PC 12 to UDP port 2345 of PC 10. Since the packet originates from within firewall 18, it is allowed to pass through firewall 18 to the Internet.

Firewall 18 typically stores the IP addresses and UDP ports of PC 10 and PC 12, and the protocol used (UDP) in a table. This table is consulted when an incoming packet is received from the Internet. When the incoming packet's protocol, source and destination IP addresses and ports match an entry in the table, the packet is allowed to pass through the firewall. Otherwise, the packet is rejected and prevented from entering the local network. Thus an opening or window through the firewall is created when a table entry is stored. The table entry allows for a reply from the external Internet to the outgoing packet.

Other kinds of firewalls may store other information, such as the originating application on PC 12, a data-link, media-access-controller, or Ethernet address. This alternate information can be used for matching packets or communications at different OSI levels from outside the firewall.

The null UDP packet from PC 12 thus creates an entry in the table of firewall 18. This entry creates window 32, allowing UDP packets to be transferred back and forth directly between PC 10 and PC 12.

The UDP packet from PC 12 is prevented from reaching PC 10 since it is blocked by firewall 14 as an un-requested UDP packet from the outside Internet. Since the UDP packet is discarded by the other firewall 14, it does not contain any important information. Ideally, a null packet is used that contains no data. This minimizes the packet size and reduces bandwidth waste. Of course, if firewall 14 is permissive or absent, the null packet can reach PC 10. Then PC 10 simply discards the null packet.

Once the null packet has been sent by PC 12 through firewall 18, PC 12 notifies external manager 20 that window 32 has been created. This firewall-open reply is sent to TCP port 80 of external manager 20 from TCP port 4321 of PC 12. TCP port 80 traffic can easily pass through firewall 18 since it appears to be web-browser traffic. The HTTP protocol may be used for the entire management connection, to satisfy restrictive application-level firewalls.

External manager 20 sends a reply to PC 10, indicating that PC 12 is now ready to stream UDP packets. The reply can contain the IP address and the UDP port that PC 12 uses, port 5432. The transport method can be simply UDP rather than stateful UDP, since PC 10 does not have to send an initial null packet. If a null packet from PC 10 is desired, then the method can be set to "STATFL_UDP", causing PC 10 to also send out a null packet. However, this second null packet may not be needed since PC 10 initiates the call.

PC 10 can now initiate a direct connection with PC 12 using high-bandwidth UDP packets. Such a direct UDP connection is ideal for multi-media data such as audio, voice, video, and binary data formats.

PC 10 sends its first UDP packet with call setup information from its port 2345 to port 5432 of PC 12. Since this UDP packet originates from the local network within firewall 14, firewall 14 opens window 30, such as by creating a table entry that includes ports 2345 and 5432, and the address of PC 12.

This first UDP packet passes through window 30 of firewall 14 to the Internet, where it is routed to firewall 18. Since the packet's ports and addresses match the table entry for window 32, firewall 18 allows the UDP packet to pass through window 32 to the local network, where it is routed to PC 12. Thus window 32 opened by the null packet from PC 12 is already set up before incoming packets arrive from PC 10.

Additional UDP packets can be sent from PC 10 to PC 12 over this path, such as a call answering response from PC 12 and voice data. Windows 30, 32 remain open for some time. Timers may close windows 30, 32 after some period of time with no packet flow, or no outgoing packets from inside the firewall. However, for most active 2-way communications, packets occur with a frequency sufficient to maintain windows 30, 32. If there is no voice in one direction for a period of time, empty voice packets can be sent out to prevent a firewall from timing-out a connection.

PC 12 also sends UDP packets containing voice data along this path, using window 30 in firewall 14 to reach PC 10 from outside firewall 14. Since these packets originate from inside firewall 18, they are allowed to pass through, and keep window 32 open by resetting the packet timer. A field in the firewall table entry can be used to store the timer value.

More details of using null packets to open communication windows in firewalls is provided in the parent application, Null-Packet Transmission from Inside a Firewall to Open a Communication Window for an Outside Transmitter, U.S. Ser. No. 09/682,084, filed Jul. 18, 2001.

Direct TCP Method—FIG. 10D

FIG. 10D shows a direct TCP transport method. Direct TCP transport method 234 is selected when both clients lack a common UDP method. PC 10 and PC 12 open management connections using TCP port 80 of external manager 20. Available TCP ports and UDP ports for direct communication are sent, and the discovery process is performed on each client to test the various transport methods each client is capable of. In particular, the discovery process finds that both firewalls 14, 18 allow TCP packets to arbitrary TCP ports (capability 4, TCP open).

PC 10 requests making a call by sending a call request to external manager 20. The direct TCP method is selected. External manager 20 replies to PC 10 with the IP address and TCP port of PC 12, and the method "TCP".

PC 10 then initiates a connection to the designated TCP port 5432 of PC 2 by sending a TCP SYN packet. PC 12 responds with a TCP SYN+ACK packet sent back to port 2345 of PC 10. PC 10 responds with a TCP ACK packet sent back to port 5432 of PC 12. Higher-level call setup information is then sent to PC 12 in a TCP packet. PC 12 sends call answering information back to PC 10 in another TCP packet. Voice data is then exchanged, with PC 10 sending VoIP voice data in the data payload of TCP packets to PC 12. PC 12 also sends voice data in the data payloads of TCP packets sent back to TCP port 2345 of PC 10.

TCP Recipient-Connect Method—FIG. 10E

FIG. 10E shows a TCP Recipient-Connect transport method. TCP Recipient-Connect transport method 236 is selected when both clients lack a common UDP method, and the recipient client is unable to accept incoming TCP connections. Instead, the TCP connection must be initiated by the recipient client, PC 12. Since the TCP connection originates from inside firewall 18, firewall 18 allows TCP packets to be exchanged between PC 12 and PC 10.

PC 10 and PC 12 open management connections using TCP port 80 of external manager 20. Available TCP ports and UDP ports for direct communication are sent, and the discovery process is performed on each client to test the various transport methods each client is capable of. In particular, the discovery process finds that firewall 18 allows TCP packets to arbitrary TCP ports, but does not allow new TCP connections that originate outside firewall 18 (capability 5, TCP Out-Only).

PC 10 requests making a call by sending a call request to external manager 20. The Recipient-Connect TCP method is selected. External manager 20 replies to PC 10 with the IP address and TCP port of PC 12, and the method "Recipient-Connect". PC 10 is instructed to wait for an incoming connect request from PC 12, the call recipient.

External manager 20 sends a message over the management connection to PC 12 with the IP address and TCP port of PC 10, the calling client. The method specified is "TCP Recipient-Connect".

PC 12, the recipient client, then initiates a connection to the designated TCP port 2345 of calling client PC 10 by sending a TCP SYN packet. This packet is allowed to pass through firewall 18 since it originates from inside firewall 18. Window 32 is opened in firewall 18, allowing future TCP packets in either direction to pass through firewall 18.

PC 10 responds with a TCP SYN+ACK packet sent back to port 5432 of PC 12. PC 12 sends back an ACK packet to complete the handshake. This establishes the TCP connection that was initiated by the recipient client. Higher-level call setup information is then sent to PC 12 in a TCP packet. PC 12 sends call answering information back to PC 10 in another TCP packet. Voice data is then exchanged, with PC 10 sending VoIP voice data in the data payload of TCP packets to PC 12. PC 12 also sends voice data in the data payloads of TCP packets sent back to TCP port 2345 of PC 10.

FIG. 10F shows a voice-proxy transport method. Transport method 240 is used when direct and recipient-connect UDP and TCP methods are not available, such as when one client is behind a restrictive firewall that allows only web-browser traffic, or when O/S proxies translate addresses and ports.

PC 10 and PC 12 each register with external manager 20 using management connections. TCP port 80 is used on external manager 20, which looks like a web server to firewalls protecting PC's 10, 12. The transport capabilities of PC 10 and PC 12 are determined using the discovery process, which finds that at least one of PC 10, 12 lacks capabilities 1-6 and 8. The PC may have one or both of capabilities 7, 9 (HTTP 80, SSL 443). The firewall may be performing application-level filtering, looking for HTTP or SSL headers in the packets.

When PC 10 requests a call to PC 12, external manager 20 determines that the only common transport method is HTTP or SSL. One PC can allow and use SSL and the other HTTP, or both can allow or use either HTTP or SSL or both. External manager 20 sends a call message over the management connection to PC 12, with the IP address of voice-proxy server 23 and the method "Voice Proxy", and the call identifier that identifies the call between PC 10 and PC 12. The method may further indicate SSL or HTTP. A similar message is sent over the management connection to PC 10, with the same call ID and same IP address of voice-proxy server 23.

PC 10 and PC 12 each connect to voice-proxy server 23 using TCP Clients with capabilities 6 or 8 can connect using TCP packets to ports 80 or 443 without using the higher-level HTTP or SSL headers and can more efficiently send voice data since the headers are not needed. However, other clients must use HTTP or SSL headers (capabilities 7 and not 6, or capability 9 and not 8). In this example, PC 10 connects to port 80 of voice-proxy server 23, and uses HTTP headers if its capability is 7 and not 6, or uses TCP packets without the HTTP headers if its capability is 6. PC 10 connects to port 443 of voice-proxy server 23, and uses SSL headers if its capability is 9 and not 8, or uses TCP packets without the SSL headers if its capability is 8.

PC 10 and PC 12 send the call identifier to voice-proxy server 23, which then finds the call endpoints and forwards setup and voice data between the two clients. Voice-proxy server 23 sends a ready message back to each client once the call information is found by voice-proxy server 23.

Calling party PC 10 initiates the call by sending call setup commands or information to port 80 of voice-proxy server 23. Voice-proxy server 23 then forwards the call setup information to PC 12. PC 12 responds with a call answer message that is sent to port 443 of voice-proxy server 23, and voice-proxy server 23 forwards the call answer message to PC 10.

Voice data from the user of PC 10 is then embedded in TCP packets and sent to port 80 of voice-proxy server 23, and the voice data is forwarded to PC 12. Voice data from PC 12 is sent to port 443 of voice-proxy server 23, which forwards the voice data to PC 10.

More details of using HTTP and SSL headers is provided in the parent application, Firewall-Tolerant Voice-Over-Internet-Protocol (VoIP) Emulating SSL or HTTP Sessions Embedding Voice Data in Cookies, U.S. Ser. No. 10/248, 762, filed Feb. 14, 2002.

Figure 11:
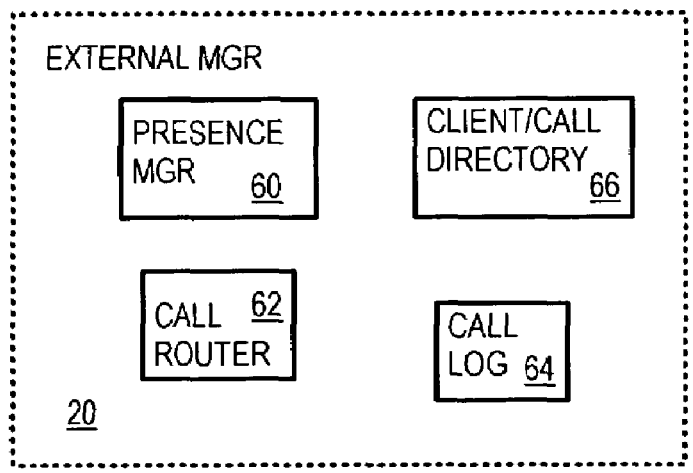
FIG. 11 is a diagram of the external manager.

FIG. 11 is a diagram of the external manager. External manager 20 is a server that is accessible to clients using Internet connections. Presence manager 60 receives registration requests from clients and keeps track in directory 66 of which client VoIP users have an active management connection to external manager 20 and can accept or make VoIP calls.

When a client requests making a new call, directory 66 is consulted to find the capabilities of the calling and recipient clients. The optimal transport method is selected, and call router 62 sends the IP address, ports, and transport method to the calling client or to the recipient client when a recipient-connect or stateful UDP method is selected. Call log 64 logs the calls that have been made.

FIG. 12 is a block diagram of software and hardware components in a direct communication system on a client computer. Voice-call application 40 is a high-level application that can be operated by a user of the client PC. The user can initiate and terminate voice or audio/video calls over the Internet using a user interface to application 40.

Telephony/Audio Services Interface (TASI) 42 is a development environment that provides an application programming interface (API) for using library features or functions called by application 40. TASI 42 can have a variety of services such as call control (detecting, placing, and terminating calls between clients) and audio stream control and formatting.

Interchange services 44 corresponds to the OSI-model transport layer. Interchange services 44 provides packet transport using IP packets. Communication sockets in Windows socket sub-system 49 can be opened by Interchange services 44 to send and receive IP packets containing audio or video data to a remote client over the Internet. Of course, socket sub-systems other than Windows can be substituted.

Multi-function resource 46 can be implemented in hardware or software or both. Multi-function resource 46 provides a host-based software layer that performs a variety of functions. Multi-function resource 46 can perform digital-signal processor (DSP) functions, such as voice compression, echo cancellation, bad frame interpolation for late or lost packets, silence compression, voice activity detection, and comfort noise generation. In addition, multi-function resource 46 provides the ability for playing wave files on multimedia subsystem 48. Multi-function resource 46 has three main subsystems: the voice compression subsystem, the packetization subsystem, and the voice quality subsystem.

Windows multimedia subsystem 48 contains the operating system drivers and low-level components that communicate with the hardware, such as a sound card or audio subsystem. Speakers and a microphone, or other multimedia devices can be connected to the hardware controlled by multimedia subsystem 48.

ALTERNATE EMBODIMENTS

Several other embodiments are contemplated by the inventors. The transport capabilities table may be stored on the client or on the external manager, and may be stored as a series of numbers or a code indicating the capabilities rather than in a tabular format as shown. The client could send the discovered capabilities to the external manager during discovery, or later at the completion of discovery or when initiating each new call.

Other capabilities could be added to the table and some capabilities combined or deleted. For example, a list of ports usable with each client could be stored along with the capabilities. The list of ports could include protocol ports 80 and 443, eliminating the need for capabilities 3 and 8. Then for certain steps in the discovery process, such as steps 210, 214, checking capability 3 is not performed, but checking that the client can use port 443 is substituted.

The steps in the discovery process or selection process could be arranged in a different order, and other steps combined, added, or deleted. Discovery steps could be performed in series or in parallel. Packets received from the external manager could be examined to determine which test is being responded to.

Other ports and protocols may be used. Separate port-pairs may be used for each direction of packet flow, and more than 2 client endpoints may share a packet stream. Multicasting may also be employed. Additional windows may be opened in the firewall to allow for multiple calls to different PC's. The order of the various steps may be changed, and additional steps can be included. The external manager and voice-proxy server can operate on a variety of ports, in addition to ports 80 and 443.

Each client can periodically send keep-alive messages on the management connection, or could periodically open a connection to the external manager or voice-proxy server, such as once every minute. A new connection could be made if some time has passed since registration. A list of several alternate UDP or TCP ports can be sent rather than a single port during registration or at another time.

The transport methods may be adjusted and altered in a variety of ways, such as by using more packets in handshakes, sending null packets in both directions rather than in just one direction, sending additional messages, etc.

The client or PC may be a portable computing device such as a personal-digital-assistant (PDA), palm computer, enhanced cell phone, Internet appliance, or other computing device rather than just a standard desktop or laptop PC. Operating systems other than Windows, such as Linux, Unix, and MacOS may be used for the PC.

The external manager can reside on a server that runs many applications including web server applications. Software routines may be stored on disks or other media, or may be programmed as firmware or programmable logic or even converted to partial or full hardware implementations. Software may be distributed, with parts residing at different physical locations. Software modules may be combined or divided in a wide variety of ways.

The invention has been described in an embodiment of two clients directly communicating with one another, such as for making basic VoIP calls, whether audio-only or with video. Additional clients may be added to the call for a 3-way or multi-way conference call. Additional connections can be made either directly between the different clients, or using one or more voice-proxy servers. The invention can also be applied to other peer-to-peer communications, such as for file-sharing systems. One of the two clients may act as a server rather than a peer, or one "client" could be a switch that connects calls to the public-switched telephone network (PSTN).

A dedicated test server could be used for discovery that is separate from the other external manager functions. Test packets could be sent to this test server rather than to the external manager, but the client could still report results to the external manager. Many test servers at different locations could be tested by the client. The external manager, voice-proxy server, and test server could each respond to many IP addresses and could be divided into sub-servers at different geographical locations.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A Voice-over-Internet-Protocol (VoIP) system comprising:

a plurality of client Voice-over-Internet-Protocol (VoIP) applications for running on a plurality of clients connected to the Internet, the client Voice-over-Internet-Protocol (VoIP) applications including a first client and a second client;

an external manager function running on a server accessible to the client Voice-over-Internet-Protocol (VoIP) applications, the external manager receiving registration requests and call requests from the client Voice-over-Internet-Protocol (VoIP) applications;

a test-packet replier running on a server accessible to the client Voice-over-Internet-Protocol (VoIP) applications, for responding to test packets containing test data by generating response packets with the test data sent back to a sending client;

a voice-proxy server accessible to the client Voice-over-Internet-Protocol (VoIP) applications using a standard web-browser connection;

a transport-capability discovery function on the external manager, and a transport-capability discovery function on each client, executed before a call request is sent to the external manager, for detecting transport capabilities of the client;

a registration process whereby a client sends its discovered transport capabilities to the external manager, and the external manager stores those capabilities prior to a client being called;

a call setup function executed by the external manager, for responding to a call request from the first client requesting to call the second client, whereby the setup function sends the first and second client a selected transport method, including protocols, port addresses and communication sequencing, as derived from the registration information, for transporting voice data directly or indirectly between the clients; wherein stateful UDP is selected as the transport method, wherein the second client further comprises a null-packet transmitter that in response to instructions from the call setup function of the external manager sends a null User Datagram Protocol (UDP) packet to the first client to open up a direct communication path when neither the first nor the second client has the incoming User Datagram Protocol (UDP) capability.

2. A Voice-over-Internet-Protocol (VoIP) system comprising:

a plurality of client Voice-over-Internet-Protocol (VoIP) applications for running on a plurality of clients connected to the Internet, the client Voice-over-Internet-Protocol (VoIP) applications including a first client and a second client;

an external manager function running on a server accessible to the client Voice-over-Internet-Protocol (VoIP) applications, the external manager receiving registration requests and call requests from the client Voice-over-Internet-Protocol (VoIP) applications;

a test-packet replier running on a server accessible to the client Voice-over-Internet-Protocol (VoIP) applications, for responding to test packets containing test data by generating response packets with the test data sent back to a sending client;

a voice-proxy server accessible to the client Voice-over-Internet-Protocol (VoIP) applications using a standard web-browser connection;

a transport-capability discovery function on the external manager, and a transport-capability discovery function on each client, executed before a call request is sent to the external manager, for detecting transport capabilities of the client;

a registration process whereby a client sends its discovered transport capabilities to the external manager, and the external manager stores those capabilities prior to a client being called;

a call setup function executed by the external manager, for responding to a call request from the first client requesting to call the second client, whereby the setup function sends the first and second client a selected transport method, including protocols, port addresses and communication sequencing, as derived from the registration information, for transporting voice data directly or indirectly between the clients; wherein recipient-connect User Datagram Protocol (UDP) is selected as the transport method, wherein the second client further comprises an initial-packet transmitter that in response to instructions from the call setup function of the external manager sends an initial User Datagram Protocol (UDP) packet to the first client to initiate the call and establish a direct communication path when the second client does not have the incoming User Datagram Protocol (UDP) capability but the first client does.

3. A Voice-over-Internet-Protocol (VoIP) system comprising:

a plurality of client Voice-over-Internet-Protocol (VoIP) applications for running on a plurality of clients connected to the Internet, the client Voice-over-Internet-Protocol (VoIP) applications including a first client and a second client;

an external manager function running on a server accessible to the client Voice-over-Internet-Protocol (VoIP) applications, the external manager receiving registration requests and call requests from the client Voice-over-Internet-Protocol (VoIP) applications;

a test-packet replier running on a server accessible to the client Voice-over-Internet-Protocol (VoIP) applications, for responding to test packets containing test data by generating response packets with the test data sent back to a sending client;

a voice-proxy server accessible to the client Voice-over-Internet-Protocol (VoIP) applications using a standard web-browser connection;

a transport-capability discovery function on the external manager, and a transport-capability discovery function on each client, executed before a call request is sent to the external manager, for detecting transport capabilities of the clients;

a registration process whereby a client sends its discovered transport capabilities to the external manager, and the external manager stores those capabilities prior to a client being called;

a call setup function executed by the external manager, for responding to a call request from the first client requesting to call the second client, whereby the setup function sends the first and second client a selected transport method, including protocols, port addresses and communication sequencing, as derived from the registration information, for transporting voice data directly or indirectly between the clients; wherein recipient-connect Transmission Control Protocol (TCP) is selected as the transport method, wherein the second client further comprises an initial-packet transmitter that in response to instructions from the call setup function of the external manager sends an initial Transmission Control Protocol (TCP) packet to the first client to initiate the call and establish a direct communication path when the second client does not have the incoming Transmission Control Protocol (TCP) capability but the first client does.

4. A Voice-over-Internet-Protocol (VoIP) system comprising:

a plurality of client Voice-over-Internet-Protocol (VoIP) applications for running on a plurality of clients connected to the Internet, the client Voice-over-Internet-Protocol (VoIP) applications including a first client and a second client;

an external manager function running on a server accessible to the client Voice-over-Internet-Protocol (VoIP) applications, the external manager receiving registration requests and call requests from the client Voice-over-Internet-Protocol (VoIP) applications;

a test-packet replier running on a server accessible to the client Voice-over-Internet-Protocol (VoIP) applications, for responding to test packets containing test data by generating response packets with the test data sent back to a sending client;

a voice-proxy server accessible to the client Voice-over-Internet-Protocol (VoIP) applications using a standard web-browser connection;

a transport-capability discovery function on the external manager, and a transport-capability discovery function on each client, executed before a call request is sent to the external manager, for detecting transport capabilities of the client;

a registration process whereby a client sends its discovered transport capabilities to the external manager, and the external manager stores those capabilities prior to a client being called;

a call setup function executed by the external manager, for responding to a call request from the first client requesting to call the second client, whereby the setup function sends the first and second client a selected transport method, including protocols, port addresses and communication sequencing, as derived from the registration information, for transporting voice data directly or indirectly between the clients; wherein voice-proxy is selected as the transport method, wherein the call setup function of the external manager sends the voice-proxy server connection information to both the first and second client, wherein the first client connects to the voice-proxy and the second client connects to the voice-proxy, thereby establishing an indirect connection between the clients, wherein the voice-proxy forwards voice data from one client to another.

* * * * *